(12) United States Patent
Brown et al.

(10) Patent No.: US 11,516,175 B2
(45) Date of Patent: Nov. 29, 2022

(54) METHODS, SYSTEMS, APPARATUSES, AND DEVICES FOR FACILITATING MANAGING DIGITAL CONTENT

(71) Applicant: Halo Innovative Solutions LLC, Stone Mountain, GA (US)

(72) Inventors: Kirk Brown, Stone Mountain, GA (US); Casey Teddell Kelly, Stone Mountain, GA (US)

(73) Assignee: HALO INNOVATIVE SOLUTIONS LLC, Stone Mountain, GA (US)

( * ) Notice: Subject to any disclaimer, the term of this patent is extended or adjusted under 35 U.S.C. 154(b) by 0 days.

(21) Appl. No.: 17/735,870

(22) Filed: May 3, 2022

(65) Prior Publication Data

US 2022/0263786 A1 Aug. 18, 2022

Related U.S. Application Data

(63) Continuation-in-part of application No. 17/402,402, filed on Aug. 13, 2021, now Pat. No. 11,323,407, which is a continuation-in-part of application No. PCT/IB2020/056146, filed on Jun. 29, 2021, and a continuation of application No. 16/909,694, filed on Jun. 23, 2020, now Pat. No. 11,102,162, and a (Continued)

(51) Int. Cl.
| | | |
|---|---|---|
| *H04L 51/52* | (2022.01) | |
| *H04L 9/40* | (2022.01) | |
| *H04L 67/06* | (2022.01) | |
| *H04L 51/10* | (2022.01) | |
| *H04L 65/70* | (2022.01) | |
| *H04L 65/611* | (2022.01) | |
| *H04L 65/75* | (2022.01) | |
| *H04L 67/50* | (2022.01) | |

(52) U.S. Cl.
CPC .............. *H04L 51/52* (2022.05); *H04L 51/10* (2013.01); *H04L 63/08* (2013.01); *H04L 65/611* (2022.05); *H04L 65/70* (2022.05); *H04L 65/762* (2022.05); *H04L 67/06* (2013.01); *H04L 67/535* (2022.05)

(58) Field of Classification Search
None
See application file for complete search history.

(56) References Cited

U.S. PATENT DOCUMENTS

| | | |
|---|---|---|
| 2010/0050129 A1 | 2/2010 | Li et al. |
| 2012/0166971 A1 | 6/2012 | Sachson et al. |

(Continued)

*Primary Examiner* — Angela Nguyen

(57) ABSTRACT

A method and system for facilitating managing digital content is provided. Further, the method comprises receiving digital content, a supplemental content identifier, and a plurality of target identifiers corresponding to a plurality of target consumer devices from the one source user device, identifying a plurality of destination servers associated with the plurality of target identifiers, identifying a supplemental content based on the supplemental content identifier, processing the digital content based on a plurality of platform characteristics corresponding to the plurality of destination servers embedding the supplemental content in the digital content, generating the supplemental content in the digital content, generating a plurality of digital content based on the processing, transmitting, the plurality of digital content to the plurality of destination servers, and authenticating a consumer with the of destination servers based on a credentials.

30 Claims, 20 Drawing Sheets

Related U.S. Application Data continuation of application No. 16/908,665, filed on Jun. 22, 2020, now abandoned, and a continuation-in-part of application No. 16/232,818, filed on Dec. 26, 2018, now Pat. No. 10,693,830, and a continuation of application No. 16/232,818, filed on Dec. 26, 2018, now Pat. No. 10,693,830.

(56) References Cited

U.S. PATENT DOCUMENTS

| | | |
|---|---|---|
| 2013/0151599 A1 | 6/2013 | Santoro et al. |
| 2013/0268973 A1 | 10/2013 | Archibong et al. |
| 2013/0346911 A1 | 12/2013 | Sripada |
| 2014/0289327 A1* | 9/2014 | Hart .................. H04L 65/4053 709/204 |
| 2020/0344498 A1* | 10/2020 | Lazar .................... H04N 5/265 |

* cited by examiner

2000 encrypting, using the processing device, the digital content before
transmitting the digital content to the plurality of destination servers — 2002

FIG. 20

METHODS, SYSTEMS, APPARATUSES, AND DEVICES FOR FACILITATING MANAGING DIGITAL CONTENT

TECHNICAL FIELD

Generally, the present disclosure relates to the field of data processing. More specifically, the present disclosure relates to methods, systems, apparatuses, and devices for facilitating managing digital content across multiple platforms.

BACKGROUND

The field of data processing is technologically important to several industries, business organizations, and/or individuals. In particular, the use of data processing is prevalent for facilitating managing digital content captured using multiple content capturing devices.

Existing techniques for facilitating managing digital content are deficient with regard to several aspects. For instance, current technologies do not manage multiple digital contents simultaneously captured using the multiple content capturing devices. Furthermore, current technologies do not control capturing of the multiple digital contents using the multiple content capturing devices. Additionally, current technologies do not effectively manage distributed digital content across media platforms.

Therefore, there is a need for methods, systems, apparatuses, and devices for facilitating managing digital content across multiple platforms that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for facilitating managing digital content, in accordance with some embodiments. Accordingly the method may include a step of receiving, using a communication device, at least one digital content from at least one source user device. Further, the method may include a step of receiving, using the communication device, a supplemental content identifier from the at least one source user device. The digital content and supplemental content may be any content captured, produced, or received by the at least one source user device or any other auxiliary devices. Further, the method may include a step of receiving, using the communication device, a plurality of target identifiers from the at least one source user device, wherein the plurality of target identifiers corresponds to a plurality of target consumer devices. Further, the method may include a step of identifying, using a processing device, a plurality of destination servers associated with the plurality of target identifiers. Further, the method may include a step of identifying, using the processing device, a supplemental content based on the supplemental content identifier. Further, the method may include a step of processing, using the processing device, the digital content based on a plurality of platform characteristics corresponding to the plurality of destination servers. The plurality of destination servers may include any digital servers with which users and consumers connectedly interact and is not limited to narrow definition of social media. For example, digital marketplaces and other servers facilitating digital transactions may fall within the definition of destination servers in the context of the present systems and methods. Further, the method may include a step of embedding, using the processing devices, the supplemental content in the digital content. Further, the method may include a step of generating, using the processing device, the supplemental content in the digital content. Further, the method may include a step of generating, using the processing device, a plurality of digital content based on the processing. Further, the method may include a step of transmitting, using the communication device, the plurality of digital content to the plurality of destination servers. Further, the method may include a step of sending, using the communication device, a plurality of consumer feedback from the plurality of target consumer devices.

Further disclosed herein is a system for facilitating managing digital content, in accordance with some embodiments. Accordingly, the system may include a communication device and a processing device. Further, the communication device may be configured for performing a step of receiving at least one digital content from at least one source user device. Further, the communication device may be configured for performing a step of receiving a supplemental content identifier from the at least one source user device. Further, the communication device may be configured for receiving a plurality of target identifiers from the at least one source user device, wherein the plurality of target identifiers corresponds to a plurality of target consumer devices. Further, the communication device may be configured for transmitting a plurality of digital content to a plurality of destination servers. Additionally, the communication device may be configured for sending a plurality of consumer feedback from the plurality of target consumer devices. Further, the processing device may be communicatively coupled with the communication device. Further, the processing device may be configured for performing a step of identifying the plurality of destination servers associated with the plurality of target identifiers. Further, the processing device may be configured for performing a step of identifying a supplemental content based on the supplemental content identifier. Further, the processing device may be configured for performing a step of processing the digital content based on a plurality of platform characteristics corresponding to the plurality of destination servers. Further, the processing device may be configured for performing a step of embedding the supplemental content in the digital content. Further, the processing device may be configured for performing a step of generating the supplemental content in the digital content. Further, the processing device may be configured for performing a step of generating the plurality of digital content based on the processing.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 20 is a flowchart of a method of encrypting data related to the transmission of digital content, in accordance with some embodiments

DETAILED DESCRIPTION

Figure 1:
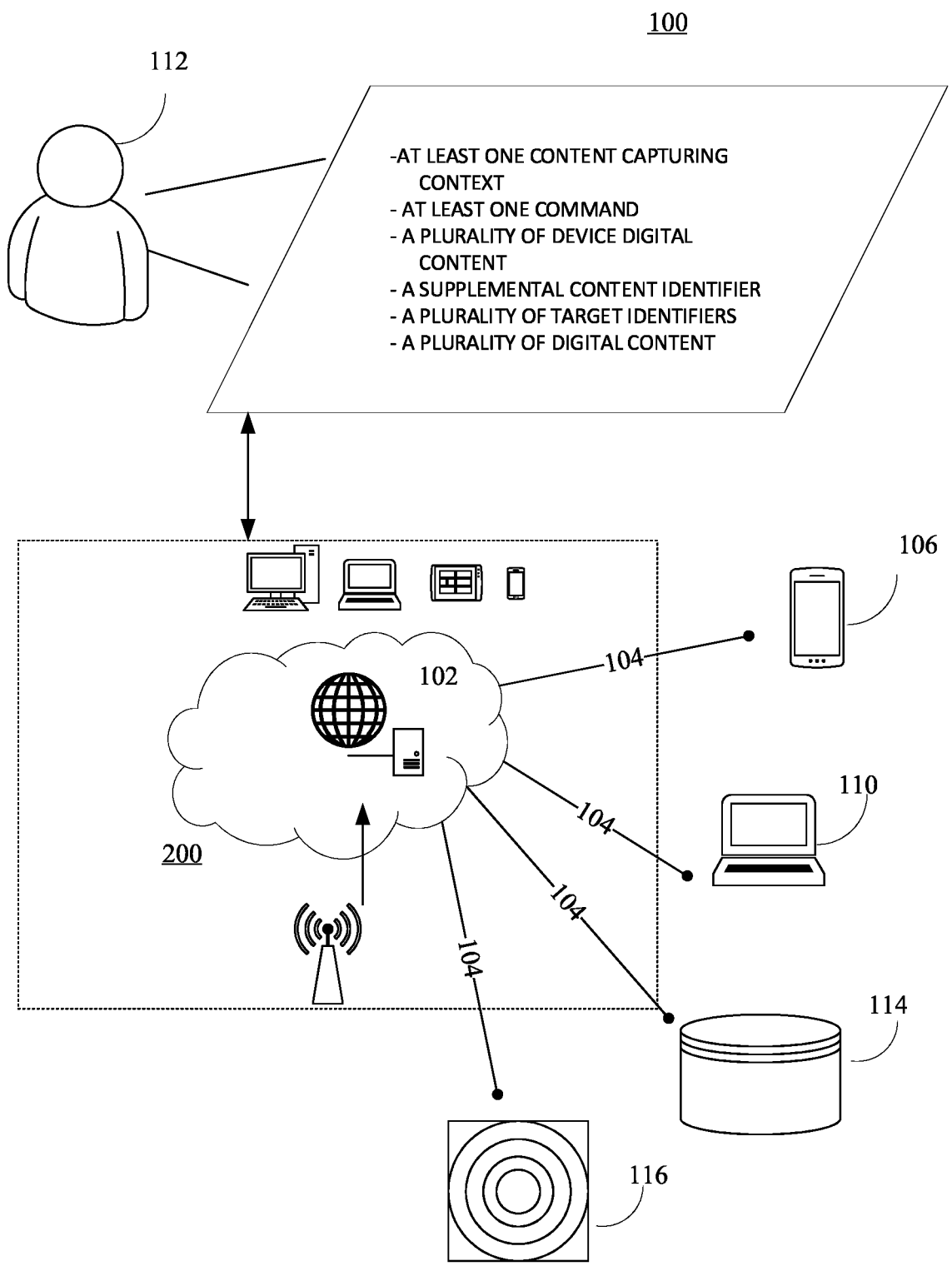
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of facilitating managing digital content captured using multiple content capturing devices, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, quantum server, a mainframe computer, mini-computer, micro-computer, blockchain server, IPFS server, a storage server, an application server (e.g. a mail server, a web server, a real-time communication server, an FTP server, a virtual server, a proxy server, a DNS server, a hypervisor, a virtual machine, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on. Further, the storage device, in some embodiments, may operate through centralized cloud storage, interplanetary file system storage, digital wallet storage, stored value card, or decentralized blockchain storage. The storage device may be configured as volatile or non-volatile storage for storing secret data encrypted keys as a form of security for authorization of connection and transaction validation.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker, and a representative thereof. Thus, the steps of the method disclosed herein are not limited to interaction or transaction between multiple parties, but may also be facilitated or overseen by a third party. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, one-time password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices and a plurality of servers interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

In at least one embodiment of the present invention, metadata may encapsulate the digital content and/or sensitive and secret data.

Overview:

The present disclosure describes methods, systems, apparatuses, and devices for facilitating managing digital content from at least one source user device. Further, multiple content capturing devices may capture content simultaneously. Further, the content capturing devices may include a plurality of cameras and at least one lidar scanner to capture content simultaneously. Further, the present disclosure describes a method, system, device, apparatus for multiple content management. Further, the present disclosure describes allowing multiple cameras for capturing, recording, live streaming, and distributing of digital content to be organized, stored, distributed, sold, transferred, invested in, and displayed. An implementation of this controls a plurality of cameras simultaneously by combining Artificial Intelligence and deep learning with Autonomous and Biometric technology. In one embodiment for live streaming using a plurality of cameras, User Sign up or Sign-in allowing access to the Application that controls a plurality of cameras. User selects application camera function QUIK MOMENTS (QM) function. QM has a Mode Panel that allows User add filters, effects, control the parameters, shutter speed, time of a multi camera content capturing device. Users can choose the moment function to work autonomously with artificial intelligence and biometric tracking. QM function has an autonomous selfie function that is activated after User set parameters such as but not limited to the Time Intervals from 12-4 am, 4-8 am, 8-12 pm, 12-4 pm, 4-8 pm, and 8-12 am. Users can pick up to 3 preselected times or enter their own activation time interval. User selects the number of snap photos or video activation allowed during a time interval. Users can set activation 20, 30, 40 minutes apart within an Interval. Users can also pick the number of photos taken during each interval from 1-4 photos, the speed standard or fast, and time between each taken from 3, 5, 10 seconds apart. Users can select how many cameras are on a device that is to be used. User sets all desired operating parameters to QM cameras it is now activated. Before an instant photo is taken User is prompt with a voice notification telling the user that they have 10 seconds countdown before cameras are activated automatically to take photos or record a video for 6 seconds. After content is capture, the User has 60 seconds to inspect and choose either to keep or discard content. If the User does not choose to keep or discard captured content will automatically be erased after 60 seconds. If Users select to keep content it will be saved to be posted to the User's Feed, Story, or Best Quik Moments section. The user is now able to stream a live event or concert or take photos capturing multiple POVs simultaneously. Quik Moments AI Automation accelerates digital transformation with enter end photo and video image capturing automation. Captured digital content will be displayed on the user device as a multiscreen, or projected on an exterior surface, or as a haptic hologram display showing each camera POV. Quik Moments process the digital images received from a front camera and back camera simultaneously. The front camera image that is captured is segmented by isolating the foreground pixel image from the background Pixel image. The back camera image that is captured is segmented by isolating the foreground pixel image from the background Pixel image. The segmented foreground front camera image and back camera image are combined to creating a new image or video in real time without reducing quality. Users can choose either the front or back camera foreground image to be the background of the new image or video. Further, the present disclosure describes capturing, recording, live streaming, and distributing digital content from a motor vehicle that has multiple interior and exterior cameras. This allows users to capture images or live stream directly from their car to the Application.

Beyond capturing content using multiple devices, the present disclosure describes systems and methods for providing broadcasting, multicasting, simulcasting, geocasting, etc., which embodies the simultaneous delivery of content using plurality of live stream social platform identifier to plurality of geographical destinations. This describes simultaneously casting in any form using a plurality of social identifiers through any computing process. Further, the present disclosure provides a live stream or distribution of digital content on social platforms using a plurality of identifiers. While streaming and broadcasting are one focus of the present invention, the management of digital content of the present invention is not limited to live streaming and may incorporate the distribution and management of digital content beyond the context of streaming and broadcasting simultaneous with the occurrence of the content.

FIG. 1 is an illustration of an online platform 100 consistent with various embodiments of the present disclosure. By way of non-limiting example, the online platform 100 to enable facilitating managing digital content captured using multiple content capturing devices may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user or consumer 112, such as the one or more relevant parties, may access online platform 100 through a web-based software application or browser. The web-based software application may be embodied as, for example, but not be limited to, a website, a web application, a desktop application, and a mobile application compatible with a computing device 200.

Figure 2:
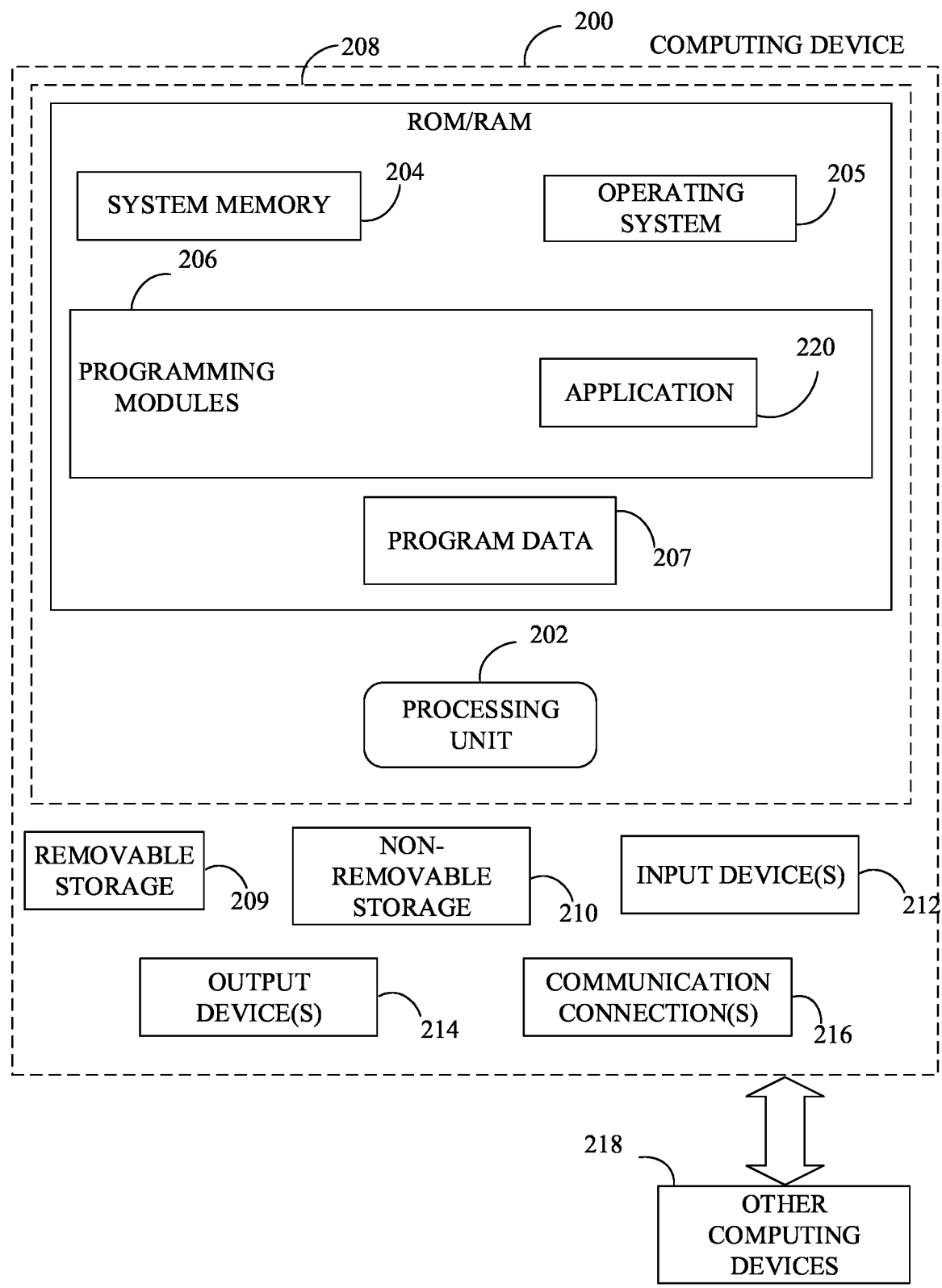
FIG. 2 is a block diagram of a computing device for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g. random-access memory (RAM)), non-volatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media.

Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. As previously noted, system memory may operate through centralized cloud storage, interplanetary file system storage, or decentralized blockchain storage with a storage device configured as volatile or non-volatile storage. Further, the disclosed methods' stages may be modified in any manner, including by reordering stages and/or inserting or deleting stages, without departing from the disclosure.

Figure 3:
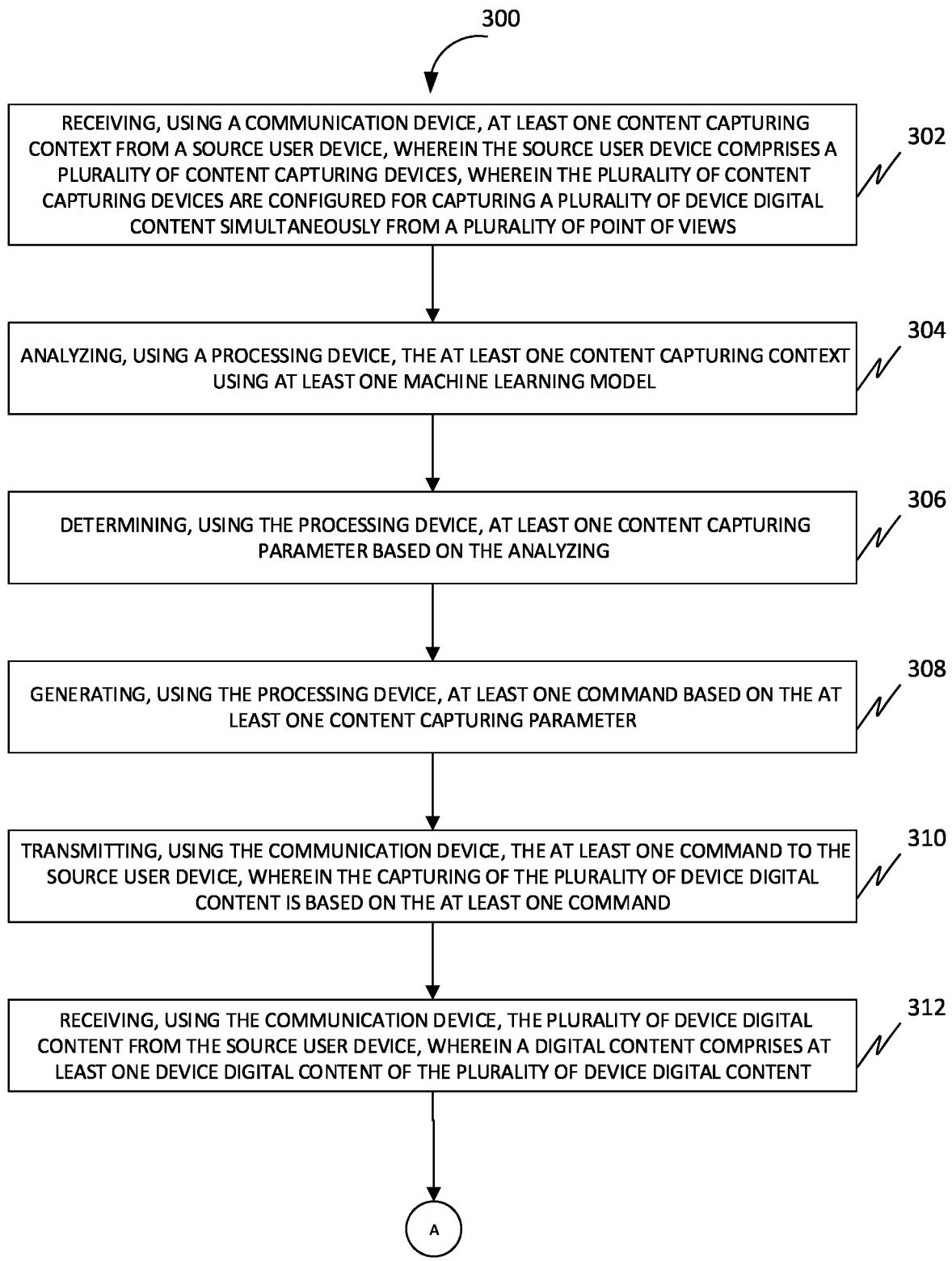
FIG. 3 is a flow chart of a method for facilitating managing digital content captured using multiple content capturing devices, in accordance with some embodiments.

FIG. 3 is a flow chart of a method 300 for facilitating managing digital content captured using multiple content capturing devices, in accordance with some embodiments.

Further, the method 300 may include a step 302 of receiving, using a communication device, one or more content capturing context from a source user device. Further, the source user device may include two or more of content capturing devices. Further, the two or more of content capturing devices are configured for capturing two or more of device digital content simultaneously from two or more of point of views. Further, the two or more of content capturing devices may include two or more cameras, two or more microphones, etc. The two or more content capturing devices may include devices for capturing digital content and is not limited to audiovisual content capturing devices such as cameras and microphones. Further, the one or more content capturing context may include any information, indication, action, etc. associated with the capturing of the two or more of device digital content. Further, in some embodiments, the two or more of content capturing devices may include a plurality of cameras and at least one LIDAR scanner. Further, the plurality of cameras and the at least one LIDAR scanner capture the two or more of device digital content simultaneously.

Further, the method 300 may include a step 304 of analyzing, using a processing device, the one or more content capturing context using one or more machine learning model.

Further, the method 300 may include a step 306 of determining, using the processing device, one or more content capturing parameter based on the analyzing.

Further, the method 300 may include a step 308 of generating, using the processing device, one or more command based on the one or more content capturing parameter.

Further, the method 300 may include a step 310 of transmitting, using the communication device, the one or more command to the source user device. Further, the capturing of the two or more of device digital content is based on the one or more command.

Further, the method 300 may include a step 312 of receiving, using the communication device, the two or more of device digital content from the source user device. Further, a digital content may include one or more device digital content of the two or more of device digital content. In some embodiments, the two or more of content capturing devices may include a front camera and a back camera. Further, the front camera may be configured for capturing one or more first image from a first point of view and the back camera may be configured for capturing one or more second image from a second point of view simultaneously. Further, the first point of view opposes the second point of view. Further, the two or more of device digital content may include the one or more first image and the one or more second image. Further, the digital content may include one or more of the one or more first image and the one or more second image.

Figure 4:
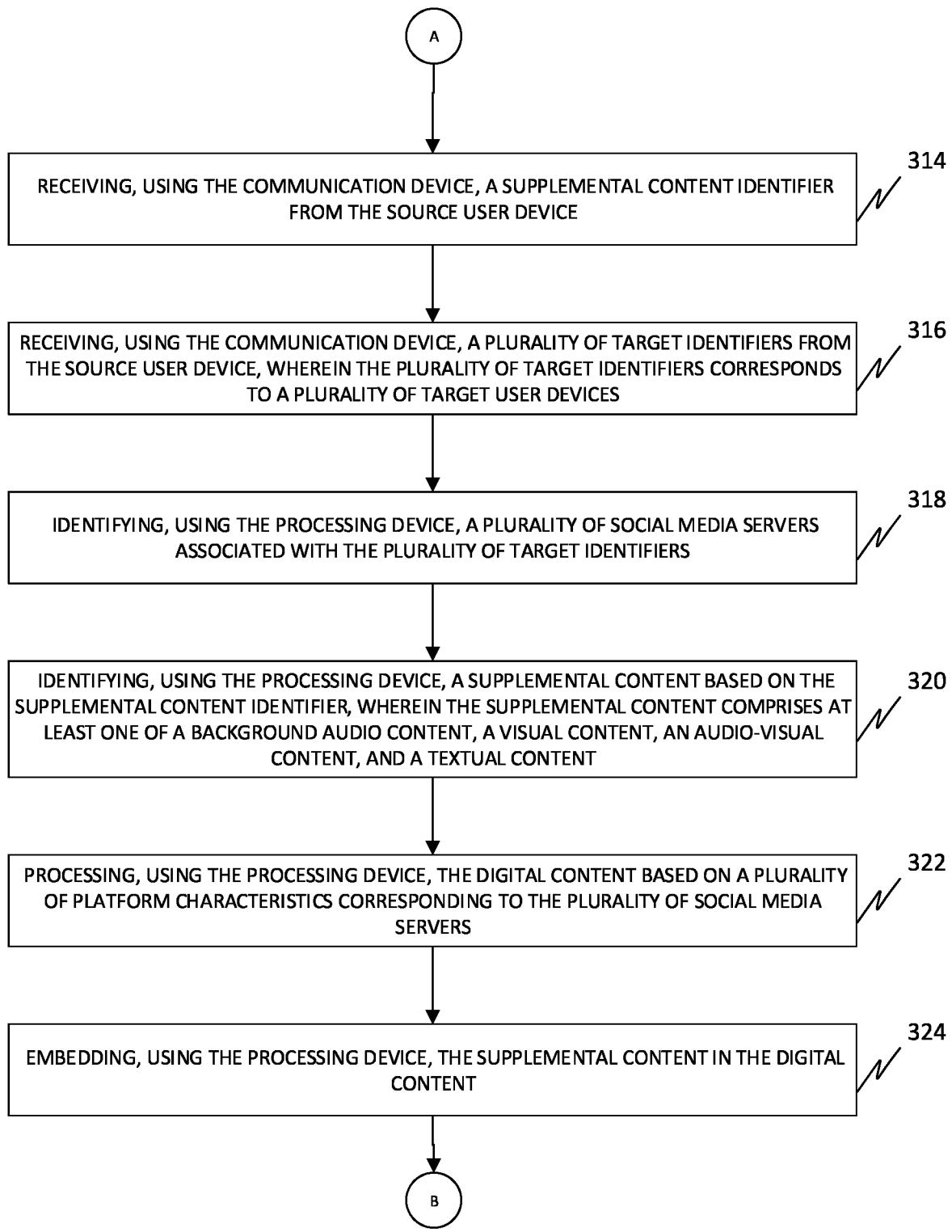
FIG. 4 is a continuation flow chart of FIG. 3.

FIG. 4 is a continuation flow chart of FIG. 3.

Further, the method 300 may include a step 314 of receiving, using the communication device, a supplemental content identifier from the source user device.

Further, the method 300 may include a step 316 of receiving, using the communication device, two or more of target identifiers from the source user device. Further, the two or more of target identifiers may corresponds to two or more of target consumer devices.

Further, the method 300 may include a step 318 of identifying, using the processing device, two or more of destination servers associated with the two or more of target identifiers.

Further, the method 300 may include a step 320 of identifying, using the processing device, a supplemental content based on the supplemental content identifier. Further, the supplemental content may include one or more of a background audio content, a visual content, an audiovisual content, and a textual content. In some embodiments, the identifying of the supplemental content may include identifying the supplemental content from the two or more of device digital content. Further, the supplemental content may include one or more first device digital content of the two or more of device digital content.

Further, the method 300 may include a step 322 of processing, using the processing device, the digital content based on two or more of platform characteristics corresponding to the two or more of destination servers.

Further, the method 300 may include a step 324 of embedding, using the processing device, the supplemental content in the digital content.

Figure 5:
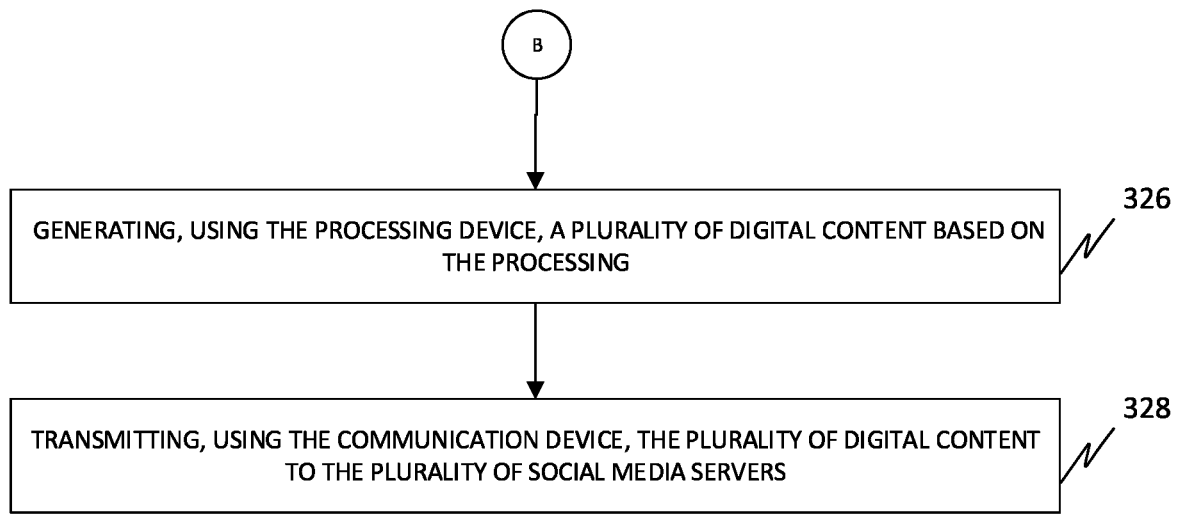
FIG. 5 is a continuation flow chart of FIG. 4.

FIG. 5 is a continuation flow chart of FIG. 4.

Further, the method 300 may include a step 326 of generating, using the processing device, two or more of digital content based on the processing.

Further, the method 300 may include a step 328 of transmitting, using the communication device, the two or more of digital content to the two or more of destination servers.

In some embodiments, the one or more content capturing parameter may include a fourth content capturing parameter. Further, the fourth content capturing parameter may include a time gap subsequent to the capturing of each plurality of device digital content of a number of the two or more of device digital content in one or more time interval. Further, the generating of the one or more command may be further based on the fourth content capturing parameter. Further, the two or more of content capturing devices interruptedly captures the number of the two or more of device digital content in the one or more time interval based on the one or more command.

In some embodiments, the one or more content capturing parameter may include a third content capturing parameter. Further, the third content capturing parameter may include a number of the two or more of device digital content to be captured in one or more time interval. Further, the generating of the one or more command may be further based on the third content capturing parameter. Further, the two or more of content capturing devices captures the number of the two or more of device digital content in the one or more time interval based on the one or more command.

In some embodiments, the one or more content capturing parameter may include a second content capturing parameter. Further, the second content capturing parameter may include one or more time interval for the capturing of the plurality device digital content. Further, the generating of the one or more command may be further based on the second content capturing parameter. Further, the two or more of content capturing devices captures the two or more of device content simultaneously during the one or more time interval based on the one or more command.

In some embodiments, the one or more content capturing parameter may include a first content capturing parameter. Further, the first content capturing parameter may include a selection of two or more content capturing devices from the two or more of content capturing devices. Further, the generating of the one or more command may be further based on the first content capturing parameter. Further, the two or more content capturing devices simultaneously captures two or more device digital content from two or more point of views of the two or more of point of views based on the one or more command. Further, the two or more of device digital content may include the two or more device digital content.

Figure 6:
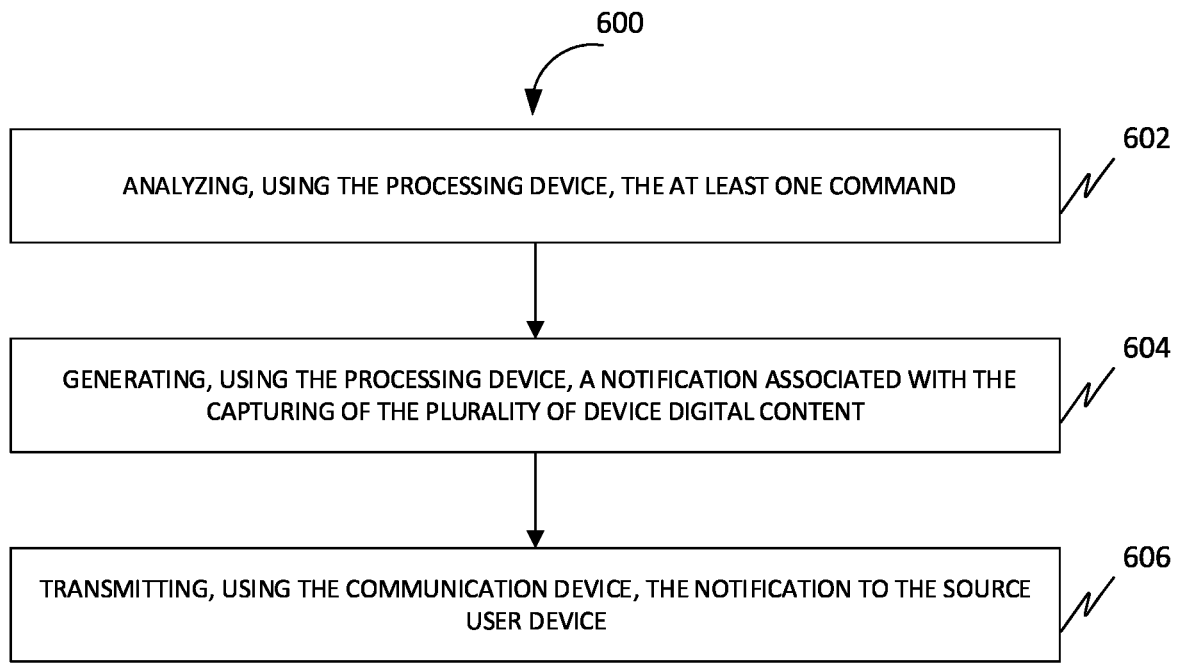
FIG. 6 is a flow chart of a method for facilitating managing digital content captured using multiple content capturing devices in which the method further includes transmitting a notification to a source user device, in accordance with some embodiments.

FIG. 6 is a flow chart of a method 600 for facilitating managing digital content captured using multiple content capturing devices in which the method 600 further includes transmitting a notification to the source user device, in accordance with some embodiments. Further, at 602, the method 600 may include analyzing, using the processing device, the one or more command. Further, at 604, the method 600 may include generating, using the processing device, a notification associated with the capturing of the two or more of device digital content. Further, at 606, the method 600 may include transmitting, using the communication device, the notification to the source user device. Further, the notification may include a voice notification.

Figure 7:
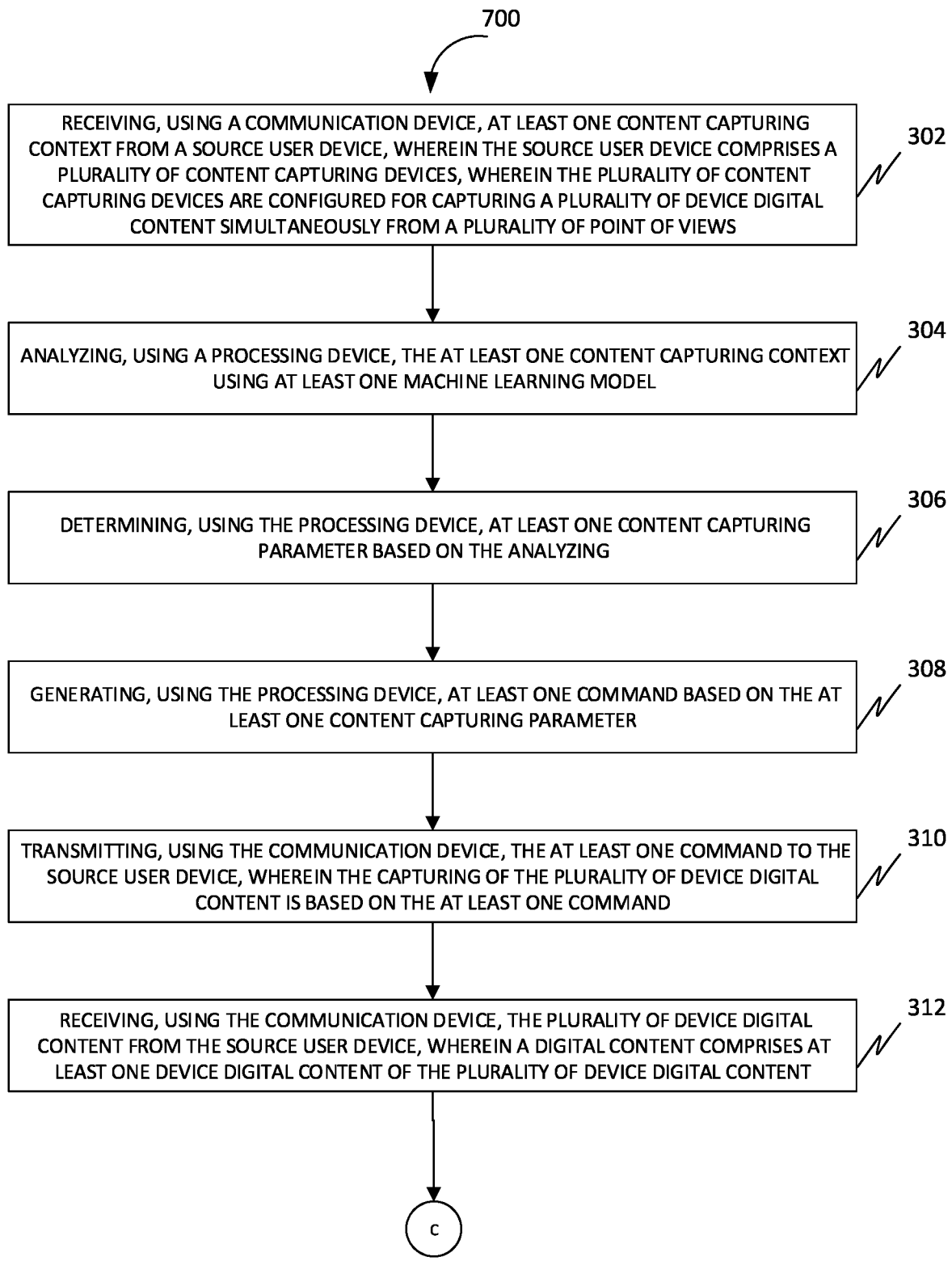
FIG. 7 is a flow chart of a method for facilitating managing digital content captured using multiple content capturing devices in which the method further includes receiving a judgment on the two or more device digital content from the source user device, in accordance with some embodiments.

FIG. 7 is a flow chart of a method 700 for facilitating managing digital content captured using multiple content capturing devices in which the method 700 further includes receiving a judgment on the two or more of device digital content from the source user device, in accordance with some embodiments.

Figure 8:
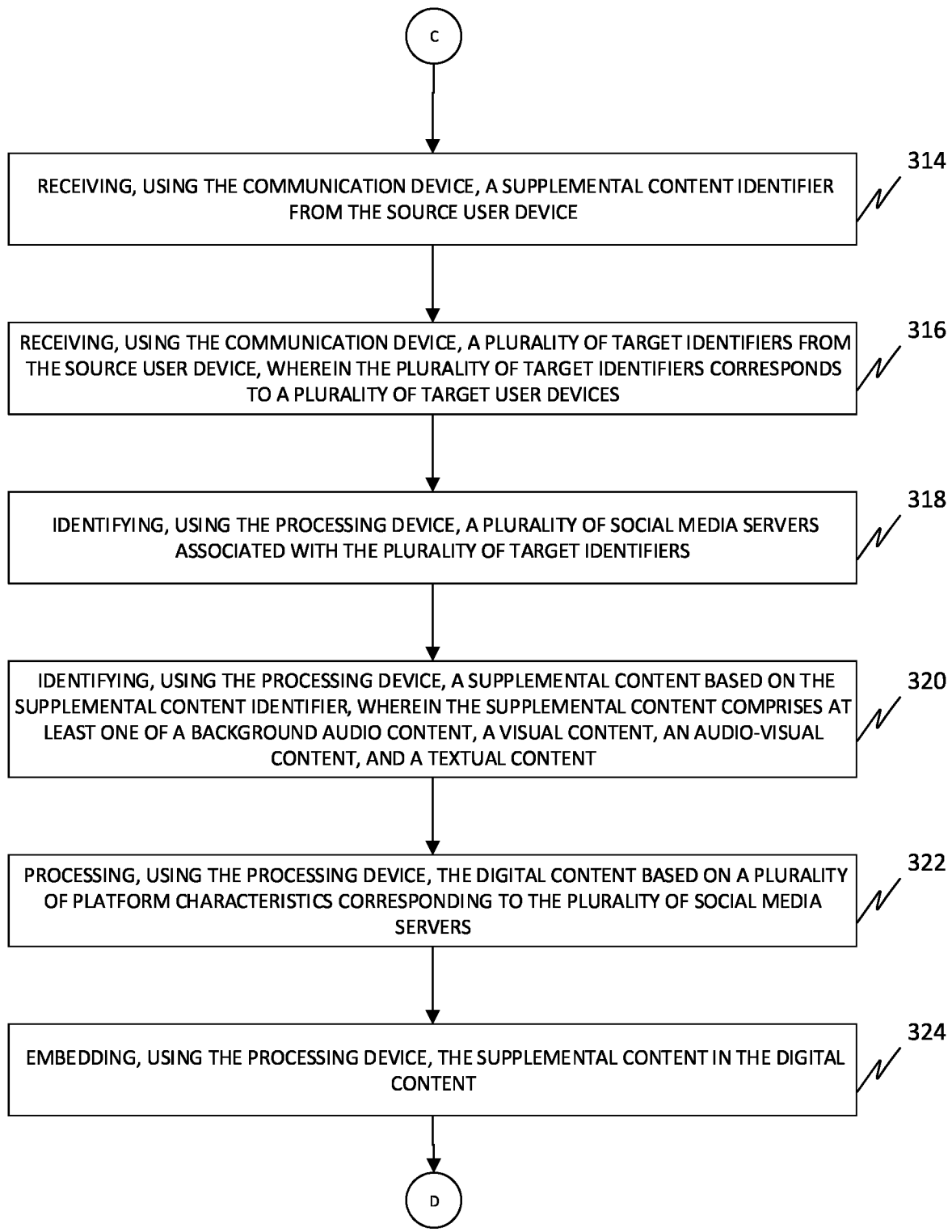
FIG. 8 is a continuation flow chart of FIG. 7.

FIG. 8 is a continuation flow chart of FIG. 7.

Figure 9:
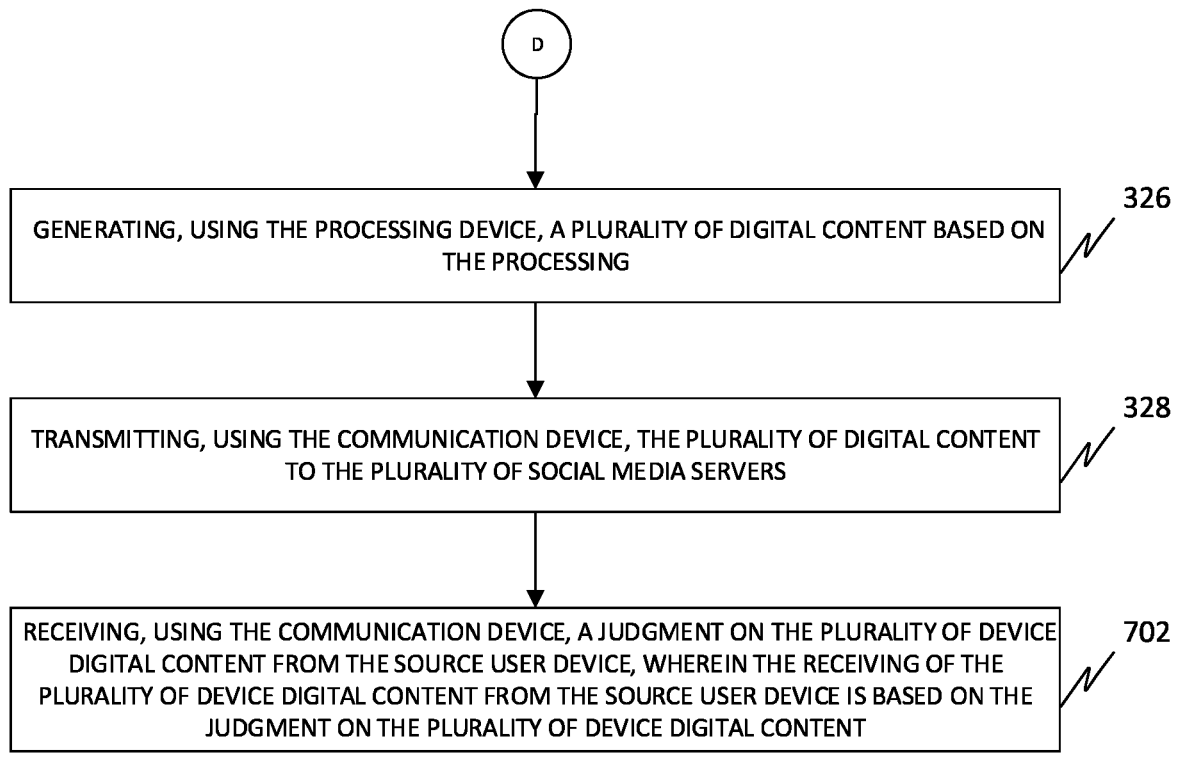
FIG. 9 is a continuation flow chart of FIG. 8.

FIG. 9 is a continuation flow chart of FIG. 8.

Further, at 702, the method 700 may include receiving, using the communication device, a judgment on the two or more of device digital content from the source user device. Further, the receiving of the two or more of device digital content from the source user device is based on the judgment on the two or more of device digital content. Further, the judgment may include a keeping of the two or more of device digital content and a discarding of the two or more of device digital content.

Figure 10:
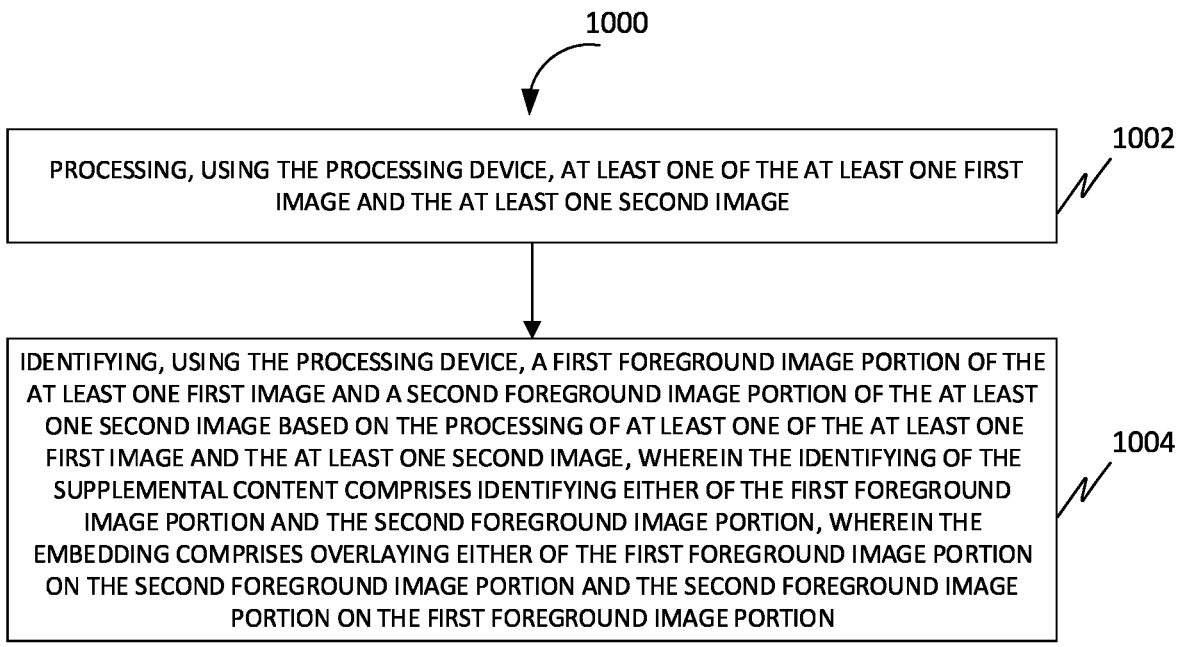
FIG. 10 is a flow chart of a method for facilitating managing digital content captured using multiple content capturing devices in which the method further includes identifying a first foreground image portion of the one or more first image and a second foreground image portion of the one or more second image based on a processing of one or more of the one or more first image and the one or more second image, in accordance with some embodiments.

FIG. 10 is a flow chart of a method 1000 for facilitating managing digital content captured using multiple content capturing devices in which the method 1000 further includes identifying a first foreground image portion of the one or more first image and a second foreground image portion of the one or more second image based on the processing of one or more of the one or more first image and the one or more second image, in accordance with some embodiments. Further, at 1002, the method 1000 may include processing, using the processing device, one or more of the one or more first image and the one or more second image. Further, the processing may include segmenting one or more of the one or more first image and the one or more second image. Further, at 1004, the method 1000 may include identifying, using the processing device, a first foreground image portion of the one or more first image and a second foreground image portion of the one or more second image based on the processing of one or more of the one or more first image and the one or more second image. Further, the identifying of the supplemental content may include identifying either of the first foreground image portion and the second foreground image portion. Further, the embedding may include overlaying either of the first foreground image portion on the second foreground image portion and the second foreground image portion on the first foreground image portion.

Figure 11:
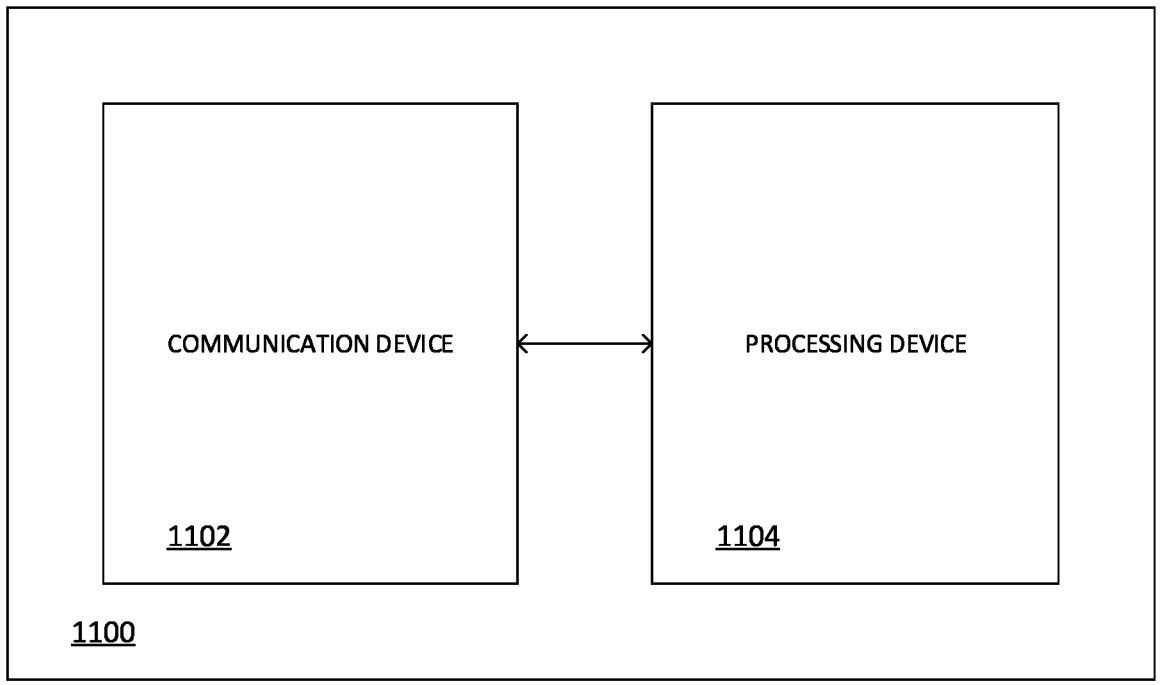
FIG. 11 is a block diagram of a system for facilitating managing digital content captured using multiple content capturing devices, in accordance with some embodiments.

FIG. 11 is a block diagram of a system 1100 for facilitating managing digital content, in accordance with some embodiments. The system 1100 may include a communication device 1102 and a processing device 1104.

Further, the communication device 1102 may be configured for performing a step of receiving one or more content capturing context from a source user device. Further, the source user device may include two or more of content capturing devices. Further, the plurality of content capturing devices may be configured for capturing two or more of device digital content simultaneously from two or more of point of views. Further, in some embodiments, the two or more of content capturing devices may include a plurality of cameras and at least one LIDAR scanner. Further, the plurality of cameras and the at least one LIDAR scanner capture the two or more of device digital content simultaneously. Further, the communication device 1102 may be configured for performing a step of transmitting one or more command to the source user device. Further, the capturing of the two or more of device digital content may be based on the one or more command. Further, the communication device 1102 may be configured for performing a step of receiving the two or more of device digital content from the source user device. Further, a digital content may include one or more device digital content of the two or more of device digital content. Further, the communication device 1102 may be configured for performing a step of receiving a supplemental content identifier from the source user device. Further, the communication device 1102 may be configured for performing a step of receiving two or more of target identifiers from the source user device. Further, the two or more of target identifiers corresponds to two or more of target consumer devices. Further, the communication device 1102 may be configured for performing a step of transmitting two or more of digital content to two or more of destination servers.

Further, the processing device 1104 may be communicatively coupled with the communication device 1102. Further, the processing device 1104 may be configured for performing a step of analyzing the one or more content capturing context using one or more machine learning model. Further, the processing device 1104 may be configured for performing a step of determining one or more content capturing parameter based on the analyzing. Further, the processing device 1104 may be configured for performing a step of generating the one or more command based on the one or more content capturing parameter. Further, the processing device 1104 may be configured for performing a step of identifying the two or more of destination servers associated with the two or more of target identifiers. Further, the processing device 1104 may be configured for performing a step of identifying a supplemental content based on the supplemental content identifier. Further, the supplemental content may include one or more of a background audio content, a visual content, an audio-visual content, and a textual content. Further, the processing device 1104 may be configured for performing a step of processing the digital content based on two or more of platform characteristics corresponding to the two or more of destination servers. Further, the processing device 1104 may be configured for performing a step of embedding the supplemental content in the digital content. Further, the processing device 1104 may be configured for performing a step of generating the two or more of digital content based on the processing.

In some embodiments, the identifying of the supplemental content may include identifying the supplemental content from the two or more of device digital content, the supplemental content may include one or more first device digital content of the two or more of device digital content.

In some embodiments, the one or more content capturing parameter may include a fourth content capturing parameter, the fourth content capturing parameter may include a time gap subsequent to the capturing of each plurality of device digital content of a number of the two or more of device digital content in one or more time interval, the generating of the one or more command may be further based on the fourth content capturing parameter, the two or more of content capturing devices interruptedly captures the number of the two or more of device digital content in the one or more time interval based on the one or more command.

In some embodiments, the one or more content capturing parameter may include a third content capturing parameter, the third content capturing parameter may include a number of the two or more of device digital content to be captured in one or more time interval, the generating of the one or more command may be further based on the third content capturing parameter, the two or more of content capturing devices captures the number of the two or more of device digital content in the one or more time interval based on the one or more command.

In some embodiments, the one or more content capturing parameter may include a second content capturing parameter, the second content capturing parameter may include one or more time interval for the capturing of the plurality device digital content, the generating of the one or more command may be further based on the second content capturing parameter, the two or more of content capturing devices captures the two or more of device content simultaneously during the one or more time interval based on the one or more command.

In some embodiments, the one or more content capturing parameter may include a first content capturing parameter, the first content capturing parameter may include a selection of two or more content capturing devices from the two or more of content capturing devices, the generating of the one or more command may be further based on the first content capturing parameter, the two or more content capturing devices simultaneously captures two or more device digital content from two or more point of views of the two or more of point of views based on the one or more command, the two or more of device digital content may include the two or more device digital content.

In some embodiments, the processing device 1104 may be configured for performing a step of analyzing the one or more command. Further, the processing device 1104 may be configured for performing a step of generating a notification associated with the capturing of the two or more of device digital content. Further, the communication device 1102 may be configured for performing a step of transmitting the notification to the source user device.

In some embodiments, the communication device 1102 may be configured for performing a step of receiving a judgment on the two or more of device digital content from the source user device. Further, the receiving of the two or more of device digital content from the source user device may be based on the judgment on the two or more of device digital content.

In some embodiments, the two or more of content capturing devices may include a front camera and a back camera, the front camera may be configured for capturing one or more first image from a first point of view and the back camera may be configured for capturing one or more second image from a second point of view simultaneously, the first point of view opposes the second point of view, the two or more of device digital content may include the one or more first image and the one or more second image, the digital content may include one or more of the one or more first image and the one or more second image.

In some embodiments, the processing device 1104 may be configured for performing a step of processing one or more of the one or more first image and the one or more second image. Further, the processing device 1104 may be configured for performing a step of identifying a first foreground image portion of the one or more first image and a second foreground image portion of the one or more second image based on the processing of one or more of the one or more first image and the one or more second image. Further, the identifying of the supplemental content may include identifying either of the first foreground image portion and the second foreground image portion. Further, the embedding may include overlaying either of the first foreground image portion on the second foreground image portion and the second foreground image portion on the first foreground image portion.

Figure 12:
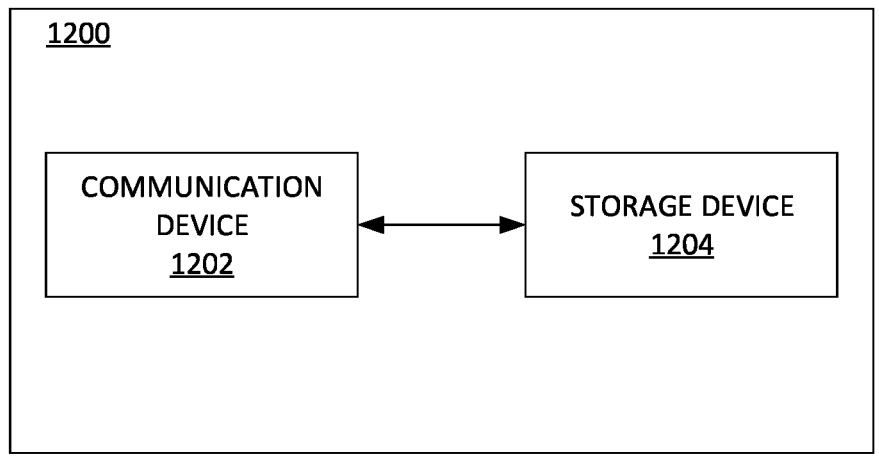
FIG. 12 is a block diagram of a system of facilitating distribution of content on multiple social media platforms, in accordance with some embodiments.

FIG. 12 is a block diagram of a system 1200 of facilitating delivery of digital content to multiple social media platforms, in accordance with some embodiments. Accordingly, the system 1200 may include a communication device 1202 and a processing device 1204.

Further, the communication device 1202 configured for receiving a digital content from a source user device (such as the mobile device 106, the electronic devices 110, etc.). Further, the source user device may include at least one content capturing device configured for generating the digital content. Further, the digital content, in an instance, may be any content in a digital form that the user (such as the user 112) may wish to use for the posting on the multiple social media platforms. For example, the digital content may include at least one of an audio content, a video content, an audio-video content, a textual content, and a haptic content and/or ultra-haptic content. Accordingly, in an instance, the ultra-haptic content may simulate a feeling of touch using, for example, acoustic energy. In some embodiments, the at least one content capturing device may include a plurality of cameras. Further, the plurality of cameras may include a front camera and a rear camera. Further, each of the front camera and the rear camera is configured to capture content simultaneously.

Further, the communication device 1202 may be configured for receiving a supplemental content identifier from the source user device.

Further, the communication device 1202 may be configured for receiving a plurality of target identifiers from the source user device. Further, the plurality of target identifiers may correspond to a plurality of target consumer devices (such as the mobile device 106, the electronic devices 110, etc.). Further, the target consumer devices, in an instance, may be devices associated with a target audience. The target audience, in an instance, may be a group of users (and/or consumers) at which the digital content (such as live digital content or pre-created digital content) may be aimed. Further, the plurality of target identifiers may include at least one location indicator. In some embodiments, the at least one location indicator is related to at least one location. Further, the at least one location may include at least one geographical location of the plurality of target consumer devices. Further, the at least one geographical location comprises at least one geographical area. Further, the at least one geographical area may include at least one continent, at least one country associated with the at least one continent, at least one state associated with the at least one country, at least one city associated with the at least one state, etc. Further, the at least one geographical area may be defined by an arbitrary geographical boundary.

In some embodiments, the plurality of target identifiers may include a plurality of social media platform identifiers corresponding to a plurality of social media platforms. Further, a first target consumer device of the plurality of target consumer devices may be associated with a first social media platform of the plurality of social media platforms. Further, a second target consumer device of the plurality of target consumer devices may be associated with a second social media platform of the plurality of social media platforms.

In some embodiments, the plurality of target identifiers may include a plurality of user identifiers associated with a plurality of social media platforms. Further, a first user identifier of the plurality of user identifiers may be associated with a first social media platform of the plurality of social media platforms. Further, a second user identifier of the plurality of user identifiers may be associated with a second social media platform of the plurality of social media platforms.

Further, the communication device 1202 may be configured for transmitting a plurality of digital content to a plurality of destination servers (such as the centralized server 102).

Further, the processing device 1204 may be configured for identifying the plurality of destination servers associated with the plurality of target identifiers. Further, the identifying of the destination servers is associated with the at least one location indicator.

Further, the processing device 1204 may be configured for identifying a supplemental content based on the supplemental content identifier. Further, the supplemental content may include at least one of a background audio content, a visual content, an audio-visual content, a textual content, and a haptic content and/or ultra-haptic content. Accordingly, in an instance, the ultra-haptic content may simulate a feeling of touch using, for example, acoustic energy. Further, the background audio content comprises at least one aurally consumable content. Further, the at least one aurally consumable content may include at least one of a music content and a voice content. Further, the visual content may include at least one visually consumable content. Further, the at least one visually consumable content comprises a multidimensional image.

Further, the processing device 1204 may be configured for processing the digital content based on a plurality of platform characteristics corresponding to the plurality of destination servers.

In some embodiments, the plurality of platform characteristics may include a plurality of content formats. Further, the processing may include transforming the digital content into the plurality of digital content based on the plurality of content formats.

Further, the processing device 1204 may be configured for embedding the supplemental content in the digital content. Further, the processing device 1204 may be configured for generating the plurality of digital content based on the processing.

In further embodiments, the processing device 1204 may be further configured for analyzing the digital content and determining the at least one location indicator based on the analyzing.

In further embodiments, the communication device 1202 may be further configured for receiving a plurality of consumer feedback from the plurality of target consumer devices. Further, the communication device 1202 may be configured for transmitting an integrated consumer feedback to the source user device. Further, the source user device may be configured for presenting the integrated consumer feedback. Further, the processing device may be configured for generating the integrated consumer feedback based on the plurality of consumer feedback.

In further embodiments, the at least one content capturing device may include the plurality of cameras. Further, the plurality of cameras detachably couplable to the device.

In further embodiments, a plurality of notifications may be transmitted to the plurality of destination servers based on the receiving of the digital content from the source user device.

In further embodiments, the embedding may include adding the supplemental content to the plurality of digital content. Further, the supplemental content may include a visual content. Further, in an instance, the visual content may include at least one watermark. Further, in an instance, the supplemental content may include the textual content. Further, the textual content may include a translation of the plurality of digital content. Further, in an instance, the supplemental content may include the background audio content. Further, the background audio content may include a voiceover of the plurality of digital content.

Further, in some embodiments, the processing device may be configured for embedding the supplement content in the plurality of digital content based on the generating of the plurality of digital content. Further, the supplemental content may be directly embedded to the plurality of digital content.

Further, in an embodiment, the embedding of the supplemental content in the digital content may be prior to the processing of the digital content.

Further, in an embodiment, the system 1200 facilitates the live streaming of the content on multiple social media platforms using a web-based software application or browser. Further, the web-based software application may include a website, a web application, a desktop application, a mobile application, etc. Further, the system 1200 may execute the web-based software application for facilitating the live streaming of the content on multiple social media platforms.

Further, in an embodiment, the source user device and the plurality of target consumer devices may execute the web-based software application.

Figure 13:
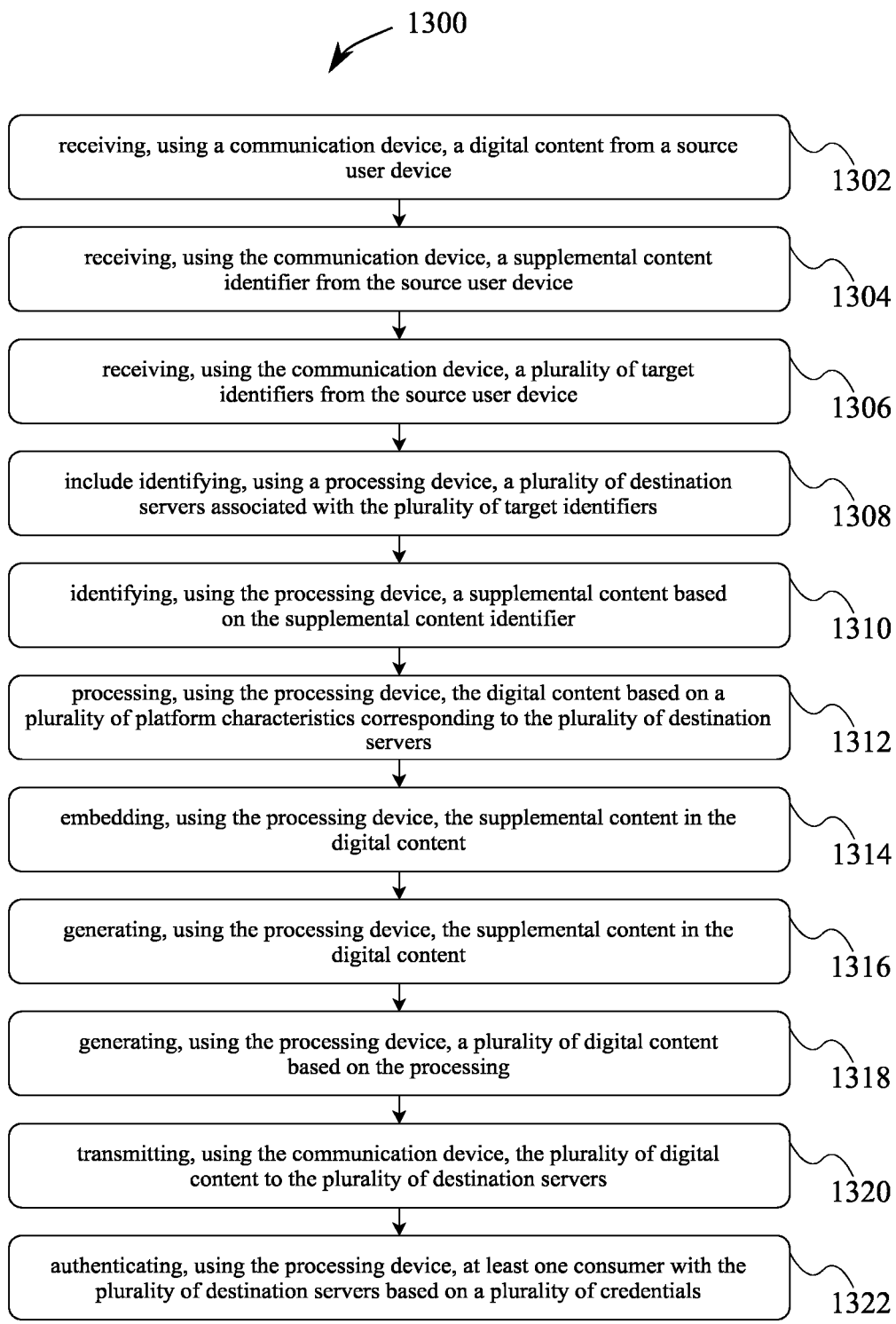
FIG. 13 is a flowchart of a method of facilitating distribution of content on multiple social media platforms, in accordance with some embodiments.

FIG. 13 is a flowchart of a method 1300 of facilitating delivery of content on multiple social media platforms, in accordance with some embodiments. Accordingly, at 1302, the method 1300 may include receiving, using a communication device, a digital content from a source user device (such as the mobile device 106, the electronic devices 110, etc.). Further, the source user device may include at least one content capturing device configured for generating the digital content. Further, the digital content, in an instance, may be any content in a digital form that the user (such as the user 112) may wish to use for the posting on the multiple social media platforms.

In some embodiments, the at least one content capturing device may include a plurality of cameras. Further, the plurality of cameras may include a front camera and a rear camera. Further, each of the front camera and the rear camera is configured to capture content simultaneously. Accordingly, based on an input to capture content, both the front camera and the rear camera may be activated simultaneously and content may be captured synchronously. Accordingly, in an instance, the digital content may include a first image captured using the front camera and a second image captured using the rear camera. Further, the first image and the second image may be captured at the same time instant. The digital content may also include images and other content captured or received digitally on the at least one content capturing device.

In further embodiments, the at least one content capturing device may include the plurality of cameras. Further, the plurality of cameras detachably couplable to the device.

Further, at 1304, the method may include receiving, using the communication device, a supplemental content identifier from the source user device.

Further, at 1306, the method may include receiving, using the communication device, a plurality of target identifiers from the source user device. Further, the plurality of target identifiers may correspond to a plurality of target consumer devices (such as the mobile device 106, the electronic devices 110, etc.). Further, the plurality of target identifiers may include at least one location indicator. Further, the at least one location indicator may be related to at least one location. Further, the at least one location comprises at least one geographical location of the plurality of target consumer devices. Further, the target consumer devices, in an instance, may be devices associated with a target audience. The target audience, in an instance, may be a group of users (and/or consumers) at which the digital content (such as the live digital content) may be aimed.

In some embodiments, the plurality of target identifiers may include a plurality of social media platform identifiers corresponding to a plurality of social media platforms. Further, a first target consumer device of the plurality of target consumer devices may be associated with a first social media platform of the plurality of social media platforms. Further, a second target consumer device of the plurality of target consumer devices may be associated with a second social media platform of the plurality of social media platforms.

In some embodiments, the plurality of target identifiers may include a plurality of user identifiers associated with a plurality of social media platforms. Further, a first user identifier of the plurality of user identifiers may be associated with a first social media platform of the plurality of social media platforms. Further, a second user identifier of the plurality of user identifiers may be associated with a second social media platform of the plurality of social media platforms.

Further, at 1308, the method may include identifying, using a processing device, a plurality of destination servers associated with the plurality of target identifiers.

Accordingly, in some embodiments, the method may include, receiving a plurality of selections corresponding to the plurality of destination servers. For example, the user may be presented with a collection of social media platform indicators. Accordingly, the user may select a plurality of social media platform indicators corresponding to the plurality of social media platforms. Further, the user may select the first social media platform as a primary social media platform and link one or more secondary social media platforms to the primary social media platform. Accordingly, in this instance, the user may perform delivery of the digital content using a graphical user interface of the primary social media platform and the digital content may be delivered to users of both the primary social media platform and the one or more secondary social media platforms.

Further, in some embodiments, the method may include, performing a plurality of authentications with the plurality of destination servers in order to transmission of the digital content. Accordingly, the method may include transmitting, using the communication device, a plurality of credentials of the user to the plurality of destination servers. In an instance, the plurality of credentials may be centrally stored and managed by one or more of the plurality of social media platforms and/or a multi-platform, multi-streaming service provider (e.g. Halo Live'). Further, the method may include authenticating, using the processing device, the user with the plurality of destination servers based on the plurality of credentials. For instance, when the user selects a social media platform of the plurality of social media platforms, credentials of the user associated with the social media platform may be transmitted to the social media server associated with the social media platform. Accordingly, the social media server may authenticate the user based on the credential and allow access to the social connections of the user and also permit communication with the social connections, including live streaming of the digital content. Additionally, in some embodiments, when the user links the primary social media platform with the one or more secondary social media platforms, the method may include authenticating the user on each of the one or more secondary social media platforms through the primary social media platform. In other words, the user may provide credentials associated with the one or more secondary social media platforms through a graphical user interface of the primary social media platform. Subsequently, based on the credentials the linking of the primary social media platform with the one or more secondary social media platforms may be completed.

Further, the cyber security associated with the present invention may utilize digital signature algorithms such as an elliptic curve digital signature algorithm for securing secret data associated with multiple digital content that may be generated. Alternatively, the present invention may utilize quantum cryptography and quantum key distribution to secure secret data associated with the digital content, the supplemental content, and/or the plurality of consumer feedback.

Quantum blockchain is a decentralized, encrypted, and distributed database based on quantum information technology and quantum computation. Data recorded on the quantum blockchain will not be tampered with after recordation. Quantum technology, artificial intelligence, and machine learning can be used to analyze massive amounts of data to uncover fraud trends, which can subsequently be used to identify fraud in real time. Implementing quantum technology is the present invention protects users against purchasing inauthentic digital content through various scams and bogus product offerings.

Further, at 1310, the method may include identifying, using the processing device, a supplemental content based on the supplemental content identifier. Further, the supplemental content may include at least one of a background audio content, a visual content, an audio-visual content, a textual content, and a haptic content. Further, the background audio content may include at least one aurally consumable content. Further, the at least one aurally consumable content may include at least one of a music content and a voice content. Further, the visual content may include at least one visually consumable content. Further, the at least one visually consumable content may include a multidimensional image, such as but not limited to, a 2D image, a 3D image, a 4D image, a 5D image, a 6D image and a 7D image. Further, the multidimensional image include at least two spatial dimensions. Additionally, in some instances, the multidimensional image may include at least one time dimension. For example, the 4D image may include three spatial dimensions and one time dimension resulting an animated 3D image. Superimposed animated multidimensional image may be a digital representation identifier of a Source User and/or Consumer. User and/or Consumer may identify it's perceptible digital representation as fluid identity, relative identity, absolute identity, and identity as selfhood. The 2D, 3D, 4D, 5D, 6D, 7D image or any combination of 2 or more dimensions for example 2D image with a 3D image.

Users, consumers, collectors, brokers and investors but not limited to this can leverage their digital content assets and secret data with a unique identifier allowing consumers to motivate a global network of users and/or consumers to run a shared immersive and interactive physical reality or extended reality in real and/or virtual world some embodiment may include data visualization, audio visualization, virtualization hypervisors, virtual machines, digital twin and so on. In one of many implementations Halo Live API and protocols utilizes device cameras and motion sensors to project physical reality and virtual content into a user's world. Various sensors relevant to critical areas of functionality are installed on devices such as but not limited wearable devices and so on. Devices assigned sensors to collect data on the energy production, temperature, weather conditions, and other characteristics of the physical object's performance. This information is subsequently sent to a processing machine, where it is applied to a generated digital copy. The virtual model can then be used to run simulations, investigate performance concerns and suggest changes, all with the purpose of gaining important insights that can ultimately be applied to the real physical object or space. Digital versions or copies of content such as but not limited to automobiles, physical real estate, art, clothing, etc. are supplemental content that can be bought and sold within the system and method of the present invention. Image manipulation and adjustments can also be implemented to create digital copies that suit the specific digital environment.

Further, at 1312, the method may include processing, using the processing device, the digital content based on a plurality of platform characteristics corresponding to the plurality of destination servers.

In some embodiments, the plurality of platform characteristics may include a plurality of content formats. Further, the processing may include transforming the digital content into the plurality of digital content based on the plurality of content formats. In general, a content format may encapsulate any characteristic of the digital content that may correspond to a particular social media platform. For example, the content format may include file type, aspect ratio, encoding/decoding type, encryption type, fidelity level, spatial resolution, temporal resolution, and so on.

Further, at 1314, the method may include embedding, using the processing device, the supplemental content in the digital content.

In further embodiments, the embedding may include adding the supplemental content to the plurality of digital content. Further, the supplemental content may include a visual content. Further, in an instance, the visual content may include at least one watermark. Further, in an instance, the supplemental content may include the textual content. Further, the textual content may include a translation of the plurality of digital content. Further, in an instance, the supplemental content may include the background audio content. Further, the background audio content may include a voiceover of the plurality of digital content.

Further, in an embodiment, the embedding of the supplemental content in the digital content may be prior to the processing of the digital content.

In further embodiments, the method may include embedding, using the processing device, the supplemental content in the plurality of digital content based on the generating of the plurality of digital content. Further, the supplemental content may be directly embedded to the plurality of digital content.

Further, at 1316, the method may include generating, using the processing device, the supplemental content in the digital content.

Further, at 1318, the method may include generating, using the processing device, a plurality of digital content based on the processing.

Further, at 1320, the method may include transmitting, using the communication device, the plurality of digital content to the plurality of destination servers.

Further, at 1322, the method 1300 may include authenticating, using the processing device, at least one consumer with the plurality of destination servers based on a plurality of credentials.

In an instance, the method 1300 of facilitating digital content distribution and management on multiple social media platforms may be used for video game live streaming, live streaming of a podcast, webinar, live news broadcast, live event, virtual event or hybrid events such as mixed reality event, live concert, auction of physical and/or digital assets, and social environment, as well as any prerecorded or previously created/captured content. Accordingly, the digital content from the source user device, such as a smartphone 106, may include an audio and/or a video stream of the user. For instance, the digital content may include an audio and/or video stream of the user providing a commentary on a video game. Further, the supplemental content may include video game content (video, and optionally audio). Accordingly, the supplemental content identifier may include an identifier (e.g. a network address, a device identifier, etc.) of an electronic device, such as, for example, a game console, configured for generating the video game content.

Accordingly, the video game content may be embedded in the audio and/or video stream of the user and consumer. A user and consumer can make in-game purchases of the digital content to be utilize and stored and traded on at least one platform associated with at least of one destination server.

In further embodiments, a plurality of notifications may be transmitted to the plurality of destination servers based on the receiving of the digital content from the source user device.

Further, in an embodiment, the method 1300 facilitates the live streaming of the content on multiple social media platforms using a web-based software application or browser. Further, the web-based software application may include a website, a web application, a desktop application, a mobile application, etc. Further, the method 1300 may use the web-based software application for performing one or more steps of the method 1300.

Further, in an embodiment, the source user device and the plurality of target consumer devices may execute the web-based software application.

Figure 14:
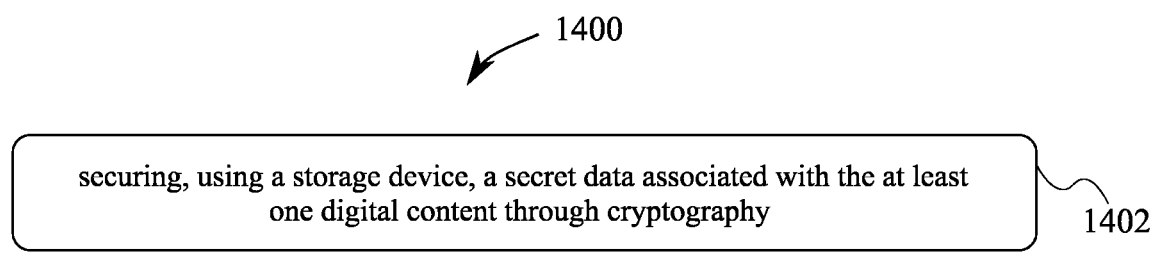
FIG. 14 is a flowchart of a method of securing secret data associated with the users and/or content, in accordance with some embodiments.

FIG. 14 is a flowchart of a method 1400 of securing secret data associated with the users and/or content. Accordingly, at 1402, the method 1400 may include securing, using a storage device, a secret data associated with the at least one digital content through cryptography.

Figure 15:
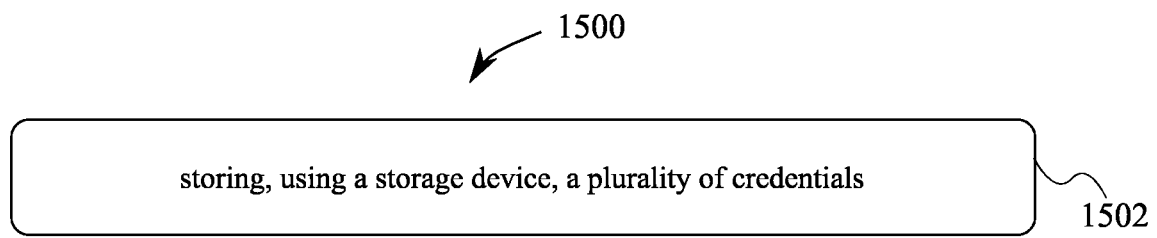
FIG. 15 is a flowchart of a method of storing credentials comprising secret data or an encrypted key, in accordance with some embodiments.

FIG. 15 is a flowchart of a method 1500 of storing credentials comprising secret data or an encrypted key. Accordingly, at 1502, the method 1500 may include storing, using a storage device, a plurality of credentials.

Figure 16:
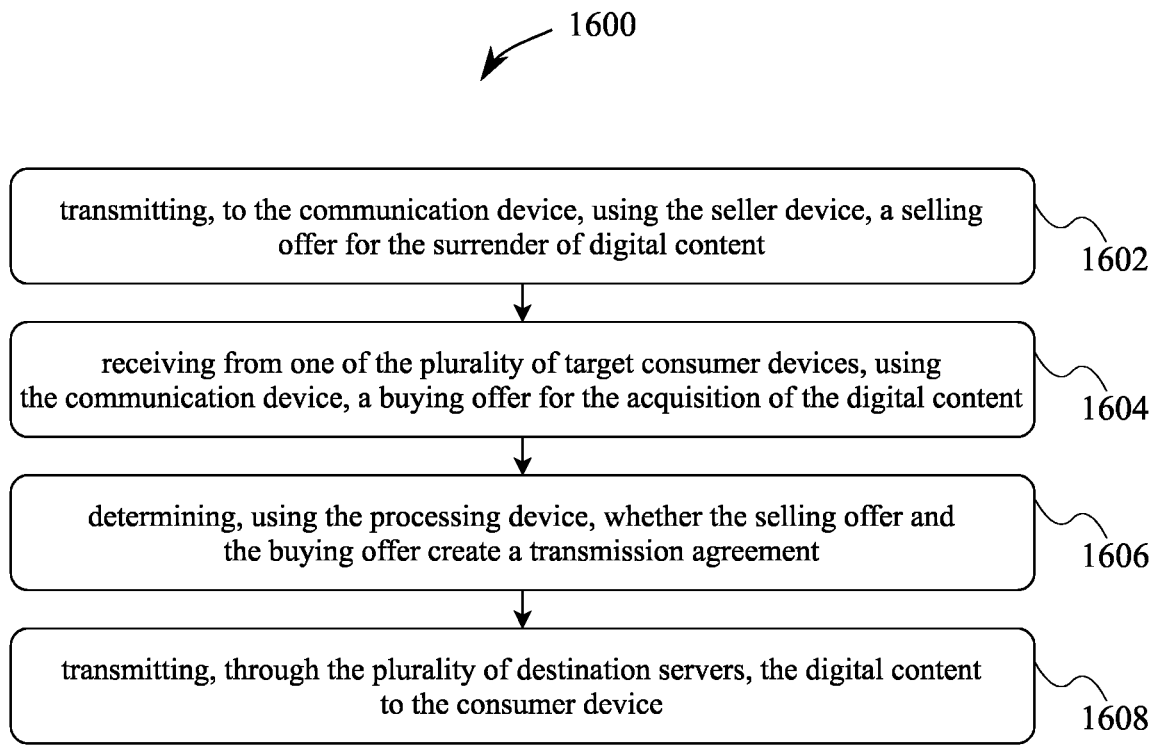
FIG. 16 is a flowchart of a method of performing a transaction associated with the present invention, in accordance with some embodiments.

FIG. 16 is a flowchart of a method 1600 of performing a transaction associated with the present invention. Accordingly, at 1602, the method may include transmitting, to the communication device, using the seller device, a selling offer for the surrender of digital content.

Further, at 1604, the method 1600 may include receiving from one of the plurality of target consumer devices, using the communication device, a buying offer for the acquisition of the digital content.

Further, at 1606, the method 1600 may include determining, using the processing device, whether the selling offer and the buying offer create a transmission agreement.

Further, at 1608, the method 1600 may include transmitting, through the plurality of destination servers, the digital content to the consumer device. This method may include the selling offer further comprising a selling order and a selling condition and the buying offer further comprising a buying order and a buying condition, wherein the transmission agreement is created if the selling order meets the buying condition and the buying order meets the selling condition.

Figure 17:
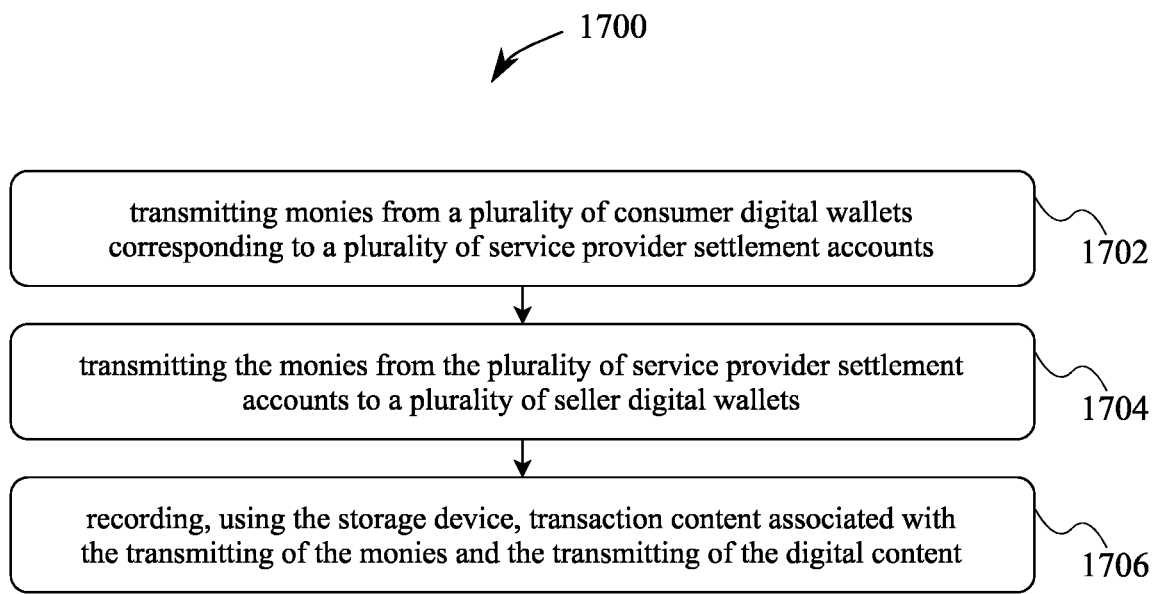
FIG. 17 is a flowchart of a method of transmitting monies between parties involved in a transaction, in accordance with some embodiments.

FIG. 17 is a flowchart of a method 1700 of transmitting monies between parties involved in a transaction. Accordingly, at 1702, transmitting monies from a plurality of consumer digital wallets corresponding to a plurality of service provider settlement accounts. Further, each of the plurality of service provider settlement accounts comprises at least one consumer settlement account. The monies transmitted from the plurality of service provider settlement accounts to a plurality of seller digital wallets.

Further, at 1704, the method 1700 may include transmitting the monies from the plurality of service provider settlement accounts to a plurality of seller digital wallets.

Further, at 1706, the method 1700 may include recording, using the storage device, transaction content associated with the transmitting of the monies and the transmitting of the digital content.

Figure 18:
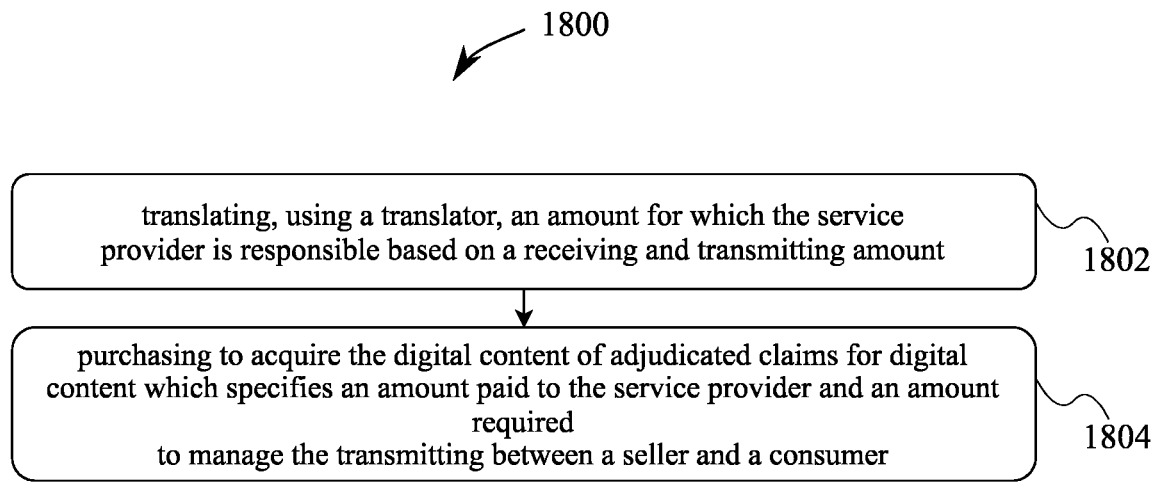
FIG. 18 is a flowchart of a method of managing payment related to transactions within the system of the present invention, in accordance with some embodiments.

FIG. 18 is a flowchart of a method 1800 managing payment related to transactions within the system of the present invention. Accordingly, at 1802, the method may include translating, using a translator, an amount for which the service provider is responsible based on a receiving and transmitting amount.

Further, at 1804, the method 1800 may include purchasing to acquire the digital content of adjudicated claims for digital content which specifies an amount paid to the service provider and an amount required to manage the transmitting between a seller and a consumer.

Figure 19:
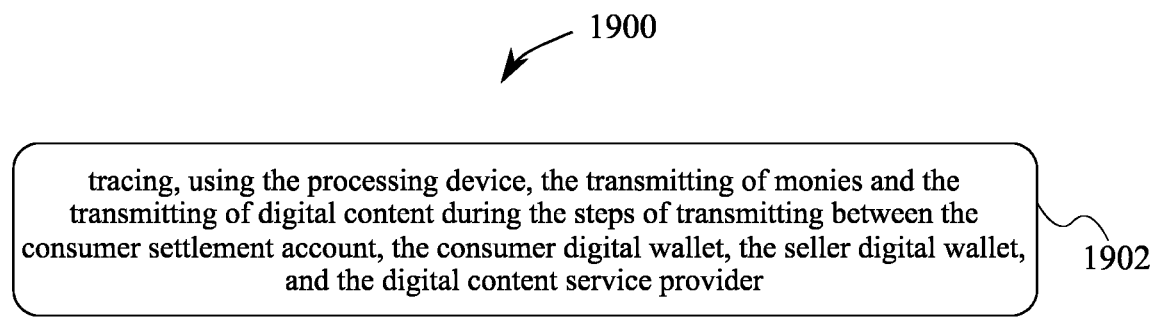
FIG. 19 is a flowchart of a method of tracing data associated with transactions, in accordance with some embodiments.

FIG. 19 is a flowchart of a method 1900 of tracing data associated with transactions. Accordingly, at 1902, the method may include tracing, using the processing device, the transmitting of monies and the transmitting of digital content during the steps of transmitting between the consumer settlement account, the consumer digital wallet, the seller digital wallet, and the digital content service provider.

FIG. 20 is a flowchart of a method 2000 of encrypting data related to the transmission of digital content. Accordingly, at 2002, the method may include encrypting, using the processing device, the digital content before transmitting the digital content to the plurality of destination servers.

According to some embodiments, a device for facilitating live streaming of content on multiple social media platforms is disclosed. Further, the device may include at least one content capturing device, a communication device, and a processing device.

Further, the at least one content capturing device may be configured for generating the digital content.

Further, the communication device may be configured for transmitting a plurality of digital content to a plurality of destination servers.

Further, the processing device may be communicatively coupled with the at least one content capturing device and the communication device. Further, the processing device may be configured for identifying the plurality of destination servers associated with a plurality of target identifiers. Further, the plurality of target identifiers corresponds to a plurality of target consumer devices. Further, the plurality of target identifiers may include at least one location indicator. Further, the processing device may be configured for identifying a supplemental content based on a supplemental content identifier. Further, the supplemental content may include at least one of a background audio content, a visual content, an audio-visual content, a textual content, and a haptic content. Further, the processing device may be configured for processing the digital content based on a plurality of platform characteristics corresponding to the plurality of destination servers. Further, the processing device may be configured for embedding the supplemental content in the plurality of digital content. Further, the processing device may be configured for generating the plurality of digital content based on the processing.

Further, in some embodiments, the processing device may be configured for embedding the supplemental content in the digital content. Further, the supplemental content may be embedded in the digital content prior to the processing of the digital content.

Further, in an embodiment, the embedding of the supplement content in the plurality of digital content may be based on the generating of the plurality of digital content. Further, the supplemental content may be directly embedded to the plurality of digital content.

Further, in some embodiments, the at least one location indicator may be related to at least one location. Further, the at least one location may include at least one geographical location of the plurality of target consumer devices. Further, the at least one geographical location may include at least one geographical area.

Further, in some embodiments, the visual content may include at least one visually consumable content. Further, the at least one visually consumable content may include a multidimensional image.

Further, in some embodiments, the background audio content may include at least one aurally consumable content. Further, the at least one aurally consumable content may include at least one of a music content and a voice content.

Further, in some embodiments, the plurality of target identifiers may include a plurality of social media platform identifiers corresponding to a plurality of social media platforms. Further, a first target consumer device of the plurality of target consumer devices may be associated with a first social media platform of the plurality of social media platforms. Further, a second target consumer device of the plurality of target consumer devices may be associated with a second social media platform of the plurality of social media platforms.

Further, in some embodiments, the plurality of target identifiers may include a plurality of user identifiers associated with a plurality of social media platforms. Further, a first user identifier of the plurality of user identifiers may be associated with a first social media platform of the plurality of social media platforms. Further, a second user identifier of the plurality of user identifiers may be associated with a second social media platform of the plurality of social media platforms.

Further, in some embodiments, the processing device may be configured for analyzing the digital content. Further, the processing device may be configured for determining the at least one location indicator based on the analyzing.

Further, in some embodiments, the plurality of platform characteristics may include a plurality of content formats. Further, the processing may include transforming the digital content into the plurality of digital content based on the plurality of content formats.

Further, in some embodiments, the processing device may be configured for generating an integrated consumer feedback based on a plurality of consumer feedback. Further, the device may be configured for presenting the integrated consumer feedback. In some embodiments, the plurality of consumer feedback may comprise at least one payment associated with the transmitting of digital content to the plurality of destination servers. The payment may be in any form of currency or exchanged value including, but not limited to, fiat money, cryptocurrency, or non-monetary exchangeable goods and services.

Further, in some embodiments, the at least one digital content and the supplemental content may be tokens and keys associated with the transfer, sale, investment, or other transaction related to non-fungible tokens. In such embodiments, the step of generating multiple digital content may be descriptive of minting digital tokens.

Further, in some embodiments, users and consumers such as buyers, collectors, brokers, digital marketplaces acting as brokers, and investors but not limited to this can leverage their digital content assets and secret data with a unique identifier allowing them to motivate a global network of users and consumers to run a shared immersive physical reality or extended reality in real and/or virtual world. Some embodiments may include data visualization, audio visualization, virtualization hypervisors, virtual machines, digital twin and so on. Source user can receive transmitted earned rewards associated with the digital content in the form of a digital asset, digital currency, or other form.

In one of many implementations Halo Live API and protocols utilizes the device's camera and motion sensors to project physical reality and virtual content into a user's world. Various sensors relevant to critical areas of functionality are installed on devices such as but not limited wearable devices and so on. Device assigned sensors collect data on the energy production, temperature, weather conditions, and other characteristics of the physical object's performance. This information is subsequently sent to a processing machine, where it is applied to a digital copy. The virtual model can then be used to run simulations, investigate performance concerns, and suggest changes, all with the purpose of gaining important insights that can ultimately be applied to the real physical thing. This applies to digital copies such as but not limited automobiles, physical real estate, art, clothing etc. Along these lines, image manipulation and adjustments can be implemented.

In one embodiment of the present invention, the system of the present invention is used to facilitate a digital content payment system for concurrently electronically transmitting monies from the plurality of consumer digital wallets corresponding to the plurality of service provider settlement accounts with at least one of the plurality of consumer digital wallets associated with an individual user or consumer. The plurality of service provider settlement accounts and the plurality of consumer digital wallets may be used with or without co-mingling funds to accumulate monies from more than one of a plurality of consumer settlement accounts in each of the plurality of service provider settlement accounts. Each service provider settlement account may correspond to an individual service provider. When the digital content payment system is used for electronic transmission of money from one of the plurality of consumer settlement accounts to one of the plurality of service provider settlement accounts, the transmission of monies may be based on the identified portion of the monies in each digital content allocated to adjudicated claims of the corresponding individual service provider.

In embodiments comprising a digital content payment system, the electronic transmission of monies and digital content may be managed separately until the monies become the property of the consumer or seller. Further, transmission of noise and transmission of digital content may include recording and storage of transaction content. In the system of digital content payment, transferred monies may include digital currency issued by a centralized bank and/or digital assets issued by an organization, among other monies.

Further, the payment of transmitted monies may include a centralized or decentralized financial instrument issued by an issuing bank or organization, wherein the financial instrument is a digital wallet key, a credit card, a debit card, or a stored value card stored in a digital wallet, payment card, or target identifier.

Further, in some embodiments, the at least one content capturing device may include a plurality of cameras. Further, the plurality of cameras may include a front camera and a rear camera. Further, each of the front camera and the rear camera may be configured to capture content simultaneously.

Further, in some embodiments, the processing device may be configured for authenticating the user with the plurality of destination servers based on a plurality of credentials of the user.

Further, in some embodiments, the at least one content capturing device may be detachably couplable to the device.

In further embodiments, the at least one content capturing device may include the plurality of cameras. Further, the plurality of cameras detachably couplable to the device.

In further embodiments, a plurality of notifications may be transmitted to the plurality of destination servers based on the generating of the digital content.

In further embodiments, the embedding may include adding the supplemental content to the plurality of digital content. Further, the supplemental content may include a visual content. Further, in an instance, the visual content may include at least one watermark. Further, in an instance, the supplemental content may include the textual content. Further, the textual content may include a translation of the plurality of digital content. Further, in an instance, the supplemental content may include the background audio content. Further, the background audio content may include a voiceover of the plurality of digital content.

Further, in an embodiment, the processing device may be configured for receiving and transmitting brainwave data and neural data. In such an embodiment, the at least one digital content, the supplemental content, and the plurality of consumer feedback may be in the form of brainwave data or neural data. This embodiment allows for a learned AI system to download brainwave data, receive and record frontal and temporal lobe data and create templates for sharing exchangeable consumption of memory, smell, speech, decision making, reasoning, and other neural processes. This embodiment may further comprise the release of substances into a duct or opening to a user's body.

Further, in an embodiment, the device facilitates the live streaming of the content on multiple social media platforms using a web-based software application or browser. Further, the web-based software application may include a website, a web application, a desktop application, a mobile application, etc. Further, the device may execute the web-based software application for facilitating the live streaming of the content on multiple social media platforms.

Further, in an embodiment, the source user device and the plurality of target consumer devices may execute the web-based software application.

Although the present disclosure has been explained in relation to its preferred embodiment, it is to be understood that many other possible modifications and variations can be made without departing from the spirit and scope of the disclosure.

What is claimed is:

1. A method for facilitating managing digital content, the method comprising:

receiving, using a communication device, at least one digital content from at least one source user device;

receiving, using the communication device, a supplemental content identifier from the at least one source user device;

receiving, using the communication device, a plurality of target identifiers from the at least one source user device, wherein the plurality of target identifiers corresponds to a plurality of target consumer devices;

identifying, using a processing device, a plurality of destination servers associated with the plurality of target identifiers;

identifying, using the processing device, a supplemental content based on the supplemental content identifier;

processing, using the processing device, the digital content based on a plurality of platform characteristics corresponding to the plurality of destination servers;

embedding, using the processing devices, the supplemental content in the digital content;

generating, using the processing device, the supplemental content in the digital content;

generating, using the processing device, a plurality of digital content based on the processing;

transmitting, using the communication device, the plurality of digital content to the plurality of destination servers; and authenticating, using the processing device, at least one consumer with the plurality of destination servers based on a plurality of credentials.

2. The method for facilitating managing digital content of claim 1, further comprising:
wherein the plurality of credentials comprises at least one of a human readable secret data, a machine-readable secret data, or an embodied characteristic unique to the consumer.

3. The method for facilitating managing digital content of claim 1, wherein the plurality of target consumer devices and the plurality of destination servers are interconnected through a communication network.

4. The method for facilitating managing digital content of claim 1, further comprising:
securing, using a storage device, a secret data associated with the at least one digital content through cryptography.

5. The method for facilitating managing digital content of claim 1, wherein the at least one digital content is a transferrable digital token.

6. The method for facilitating managing digital content of claim 1, wherein the at least one digital content is brainwave data for exchangeable consumption of neural information.

7. The method for facilitating managing digital content of claim 1, further comprising:
storing, using a storage device, a plurality of credentials; and
wherein the plurality of credentials comprises a secret data encrypted key and a form, format and content of the digital content includes metadata.

8. The method for facilitating managing digital content of claim 1, wherein a payment of the transferred monies includes one of a digital currency issued by a centralized bank and a digital asset issued by at least one of a person, a group, or an organization.

9. The method for facilitating managing digital content of claim 1, further comprising:
the at least one source user device comprising a seller device;

transmitting to the communication device, using the seller device, a selling offer for the surrender of the digital content;

receiving, from one of the plurality of target consumer devices, using the communication device, a buying offer for the acquisition of the digital content;

determining, using the processing device, whether the selling offer and the buying offer create a transmission agreement;

transmitting, through the plurality of destination servers, the digital content to the consumer device.

10. The method for facilitating managing digital content of claim 9, further comprising:
transmitting monies from a plurality of consumer digital wallets corresponding to a plurality of service provider settlement accounts, wherein each of the plurality of service provider settlement accounts comprises at least one consumer settlement account;

the monies transmitted from the plurality of consumer digital wallets corresponding to the transmission agreement;

transmitting the monies from the plurality of service provider settlement accounts to a plurality of seller digital wallets;

recording, using the storage device, transaction content associated with the transmitting of the monies and the transmitting of the digital content; and tracing, using the processing device, the transmitting of monies and the transmitting of digital content during the steps of transmitting between the consumer settlement account, the consumer digital wallet, the seller digital wallet, and the digital content service provider.

11. The method for facilitating managing digital content of claim 10, further comprising:
translating, using a translator, an amount for which the service provider is responsible based on a receiving and transmitting amount;

purchasing to acquire the digital content of adjudicated claims for digital content which specifies an amount paid to the service provider and an amount required to manage the transmitting between a seller and a consumer; and wherein the seller device is associated with one of the plurality of destination servers.

12. The method for facilitating managing digital content of claim 9, wherein a payment of the monies includes one of a centralized financial instrument and a decentralized financial instrument issued by an issuing bank or organization and stored in a digital wallet, card, or target identifier.

13. The method for facilitating managing digital content of claim 12, wherein the instrument includes at least one of a digital wallet, a credit card, a debit card, and a stored value card.

14. The method for facilitating managing digital content of claim 9, further comprising:
encrypting, using the processing device, the digital content before transmitting the digital content to the plurality of destination servers.

15. The method for facilitating managing digital content of claim 9, further comprising:
the selling offer further comprising a selling order and a selling condition;
the buying offer further comprising a buying order and a buying condition; and
wherein the transmission agreement is created if the selling order meets the buying condition and the buying order meets the selling condition.

16. A system for facilitating managing digital content, the system comprising:
- a communication device configured for:
  - receiving at least one digital content from at least one source user device;
  - receiving a supplemental content identifier from the at least one source user device;
  - receiving a plurality of target identifiers from the at least one source user device, wherein the plurality of target identifiers corresponds to a plurality of target consumer devices; and
  - transmitting a plurality of digital content to a plurality of destination servers;
- a processing device communicatively coupled with the communication device, wherein the processing device is configured for:
  - identifying the plurality of destination servers associated with the plurality of target identifiers;
  - identifying a supplemental content based on the supplemental content identifier;
  - processing the digital content based on a plurality of platform characteristics corresponding to the plurality of destination servers;
  - embedding the supplemental content in the digital content;
  - generating the supplemental content in the digital content; and
  - generating the plurality of digital content based on the processing; and
  - authenticating a consumer with the plurality of destination servers based on a plurality of credentials.

17. The system for facilitating managing digital content of claim 16, wherein the plurality of credentials comprises at least one of a human readable secret data, a machine-readable secret data, or an embodied characteristic unique to the consumer.

18. The system for facilitating managing digital content of claim 16, wherein the plurality of target consumer devices and the plurality of destination servers are interconnected through a communication network.

19. The system for facilitating managing digital content of claim 16, further comprising:
a storage device, wherein the storage device is configured to secure a secret data associated with the at least one digital content through cryptography.

20. The system for facilitating managing digital content of claim 16, wherein the at least one digital content is a transferrable digital token.

21. The system for facilitating managing digital content of claim 16, wherein the at least one digital content is brainwave data for exchangeable consumption of neural information.

22. The system for facilitating managing digital content of claim 16, further comprising:
a storage device, configured to store a plurality of credentials, wherein the plurality of credentials comprises a secret data key and a form, format, and content of the digital content includes metadata.

23. The system for facilitating managing digital content of claim 16, wherein a payment of the transferred monies includes one of a digital currency issued by a centralized bank and a digital asset issued by at least one of a person, a group, and an organization.

24. The system for facilitating managing digital content of claim 16, further comprising:
the at least one source user device comprising a seller device;
the seller device configured to transmit a selling offer for the surrender of digital content;
the plurality of consumer devices being configured for transmitting a buying offer for the acquisition of the digital content;
the processing device being further configured to determine whether the selling offer and the buying offer create a transmission agreement; and
the communication device being further configured to transmit the digital content to the consumer device.

25. The system for facilitating managing digital content of claim 24, further comprising:
a plurality of consumer digital wallets corresponding to a plurality of service provider settlement accounts, wherein each of the plurality of service provider settlement accounts comprises at least one consumer settlement account;
the plurality of consumer digital wallets corresponding to the transmission agreement and configured to transmit monies;
the plurality of service provider settlement accounts configured to transmit the monies to a plurality of seller digital wallets;
the storage device being further configured to record transaction content associated with the transmitting of the monies and the transmitting of the digital content; and
the processing device being further configured for tracing the transmitting of monies and the transmitting of digital content during the steps of transmitting between the consumer settlement account, the consumer digital wallet, the seller digital wallet, and the digital content service provider.

26. The system for facilitating managing digital content of claim 25, further comprising:
a translator configured for translating an amount for which the service provider is responsible based on a receiving amount and a transmitting amount, wherein the seller device is associated with one of the plurality of destination servers.

27. The system for facilitating managing digital content of claim 24, wherein a payment of the monies includes one of a centralized financial instrument and a decentralized financial instrument issued by an issuing bank or organization and stored in a digital wallet, card, or target identifier.

28. The system for facilitating managing digital content of claim 27, wherein the instrument includes at least one of a digital wallet, a credit card, a debit card, and a stored value card.

29. The system for facilitating managing digital content of claim 24, further comprising:
the processing device being further configured to encrypt the digital content before transmitting the digital content to the plurality of destination servers.

30. The system for facilitating managing digital content of claim 24, further comprising:
the selling offer further comprising a selling order and a selling condition;
the buying offer further comprising a buying order and a buying condition; and
wherein the transmission agreement is created if the selling order meets the buying condition and the buying order meets the selling condition.

* * * * *